United States Patent
Peng et al.

(10) Patent No.: US 11,153,901 B2
(45) Date of Patent: Oct. 19, 2021

(54) METHOD FOR DETERMINING TIME INFORMATION, NETWORK NODE, AND TERMINAL DEVICE

(71) Applicant: HUAWEI TECHNOLOGIES CO., LTD., Guangdong (CN)

(72) Inventors: Jinlin Peng, Shanghai (CN); Javad Abdoli, Ottawa (CA); Hao Tang, Shanghai (CN); Zhenfei Tang, Ottawa (CA); Fan Wang, Berkshire (GB)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 77 days.

(21) Appl. No.: 16/579,434

(22) Filed: Sep. 23, 2019

(65) Prior Publication Data
US 2020/0022178 A1      Jan. 16, 2020

Related U.S. Application Data

(63) Continuation of application No. PCT/CN2018/079931, filed on Mar. 22, 2018.

(30) Foreign Application Priority Data

Mar. 24, 2017  (CN) .................. 201710184702.3
May 15, 2017   (CN) .................. 201710340424.6
Nov. 24, 2017  (CN) .................. 201711192667.6

(51) Int. Cl.
*H04J 3/00*       (2006.01)
*H04W 72/12*      (2009.01)
(Continued)

(52) U.S. Cl.
CPC ....... *H04W 72/1289* (2013.01); *H04L 1/1854* (2013.01); *H04L 1/1887* (2013.01); *H04W 72/0446* (2013.01)

(58) Field of Classification Search
CPC .......... H04W 72/1289; H04W 72/0446; H04L 1/1854; H04L 1/1887
See application file for complete search history.

(56) References Cited

U.S. PATENT DOCUMENTS

2010/0098051 A1*  4/2010  Uemura .............. H04W 56/007
                                                370/350
2010/0316008 A1   12/2010  Kim et al.
(Continued)

FOREIGN PATENT DOCUMENTS

CN      101667985 A    3/2010
CN      102752862 A    10/2012
(Continued)

OTHER PUBLICATIONS

Intel Corporation: "Minimum HARQ processing time and Number of HARQ processes",3GPP Draft; R1-1702238,Feb. 12, 2017,total 3 pages.
(Continued)

*Primary Examiner* — Erika A Washington
(74) *Attorney, Agent, or Firm* — Womble Bond Dickinson (US) LLP

(57) ABSTRACT

A method for determining time information is disclosed. The method includes: obtaining, by a network node, information sent by a terminal device; and determining, by the network node, at least one of the following based on the information: a first time interval between downlink scheduling and downlink data transmission, a second time interval between the downlink data transmission and a feedback message sent by the terminal device after the terminal device receives downlink data, and a third time interval between uplink scheduling and uplink data transmission, where the information may include at least one of a subcarrier spacing, an operating band, and a bandwidth that are supported by the terminal device, and further include a first smallest value and/or a
(Continued)

second smallest value and/or a third smallest value corresponding to the at least one item. Therefore, flexibility and accuracy of determining the time information are improved.

18 Claims, 12 Drawing Sheets

(51) Int. Cl.
*H04L 1/18* (2006.01)
*H04W 72/04* (2009.01)

(56) References Cited

U.S. PATENT DOCUMENTS

| | | | |
|---|---|---|---|
| 2011/0096768 A1 | 4/2011 | Park et al. | |
| 2011/0164515 A1* | 7/2011 | Park | H04W 72/1278 370/252 |
| 2014/0321452 A1* | 10/2014 | Choi | H04W 74/0833 370/350 |
| 2014/0325301 A1* | 10/2014 | Gao | H04W 72/042 714/748 |
| 2017/0117992 A1 | 4/2017 | Frederiksen et al. | |

FOREIGN PATENT DOCUMENTS

| | | |
|---|---|---|
| CN | 105790895 A | 7/2016 |
| WO | 2015149862 A1 | 10/2015 |

OTHER PUBLICATIONS

3GPP TS 36.306 V14.2.0 (Mar. 2017);3rd Generation Partnership Project;Technical Specification Group Radio Access Network;Evolved Universal Terrestrial Radio Access (E-UTRA);User Equipment (UE) radio access capabilities (Release 14);total 74 pages.

Huawei et al: "Discussion on timing relations for NR frame structure",3GPP Draft; R1-166105, Aug. 21, 2016, total 4 pages.

NTT DOCOMO et al.,"WF on scheduling and HARQ-ACK feedback timing",3GPP TSG RAN WG1 AH_NR Meeting R1-1701354,Spokane, USA, Jan. 16-20, 2017,total 4 pages.

Huawei et al:"HARQ feedback timing for NR",3GPP Draft; R1-1706961,May 14, 2017,total 3 pages.

LG Electronics et al.,"WF on HARQ timing for NR",3GPP TSG RAN WG1 NR Ad-Hoc R1-1701440 Spokane, Jan. 16-20, 2017, USA,total 2 pages.

\* cited by examiner

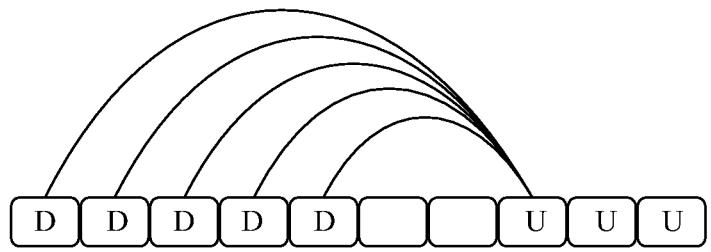

FIG. 11

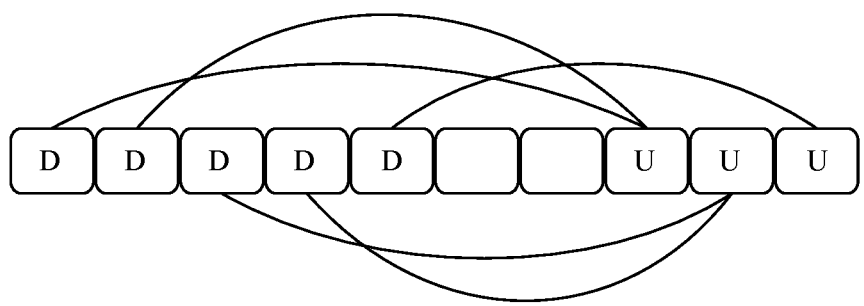

FIG. 12

A terminal device obtains second smallest values determined in a plurality of manners, where the plurality of manners include at least two of the following: a predefined manner, a SIB signaling indication manner, an RRC signaling indication manner, and a manner of determining a second smallest value based on a minimum processing time of the terminal device — S3

The terminal device selects one second smallest value from the second smallest values determined in the plurality of manners — S4

FIG. 13

METHOD FOR DETERMINING TIME INFORMATION, NETWORK NODE, AND TERMINAL DEVICE

CROSS-REFERENCE TO RELATED APPLICATIONS

This application is a continuation of International Application No. PCT/CN2018/079931, filed on Mar. 22, 2018, which claims priority to Chinese Patent Application No. 201710184702.3, filed on Mar. 24, 2017 and Chinese Patent Application No. 201710340424.6, filed on May 15, 2017 and Chinese Patent Application No. 201711192667.6, filed on Nov. 24, 2017. The disclosures of the aforementioned applications are hereby incorporated by reference in their entireties.

TECHNICAL FIELD

The present disclosure relates to the field of communications technologies, and in particular, to a method for determining time information, a network node, and a terminal device.

BACKGROUND

A hybrid automatic repeat request (HARQ) mechanism is introduced in a Long Term Evolution (LTE) system. The mechanism uses a stop-and-wait protocol to send data. Three time relationships are used in the current HARQ mechanism: a time relationship between downlink scheduling and downlink data transmission corresponding to the downlink scheduling; a time relationship between the downlink data transmission and a feedback message (hybrid automatic repeat request-acknowledgment (HAQR-ACK)) sent by a terminal device after the terminal device receives the downlink data that is transmitted; and a time relationship between uplink scheduling and uplink data transmission corresponding to the uplink scheduling. The time relationships may be understood as time intervals. For example, the time relationship between the downlink scheduling and the downlink data transmission corresponding to the downlink scheduling may be understood as a time interval between the downlink scheduling and the downlink data transmission corresponding to the downlink scheduling.

Currently, the three time relationships are all fixedly configured by a base station. Therefore, the fixed configuration mode is inflexible, and the fixedly configured time relationships are inaccurate.

SUMMARY

One embodiment of the present disclosure provides a method for determining time information, a network node, and a terminal device, to improve flexibility of determining time information, and accuracy of the time information because all the time information is determined by using information sent by a terminal device.

According to a first aspect, one embodiment of the present disclosure provides a method for determining time information, where the method includes: obtaining, by a network node, information sent by a terminal device; and determining, by the network node, at least one of the following based on the information: a first time interval between downlink scheduling and downlink data transmission, a second time interval between the downlink data transmission and a feedback message sent by the terminal device after the terminal device receives the downlink data, and a third time interval between uplink scheduling and uplink data transmission.

To be specific, the network node determines at least one of the following based on the information: the first time interval between the downlink scheduling and the downlink data transmission, the second time interval between the downlink data transmission and sending the feedback message by the terminal device after receiving the downlink data, and the third time interval between the uplink scheduling and the uplink data transmission. The information may include at least one of a subcarrier spacing, an operating band, and a bandwidth that are supported by the terminal device, and further include a first smallest value and/or a second smallest value and/or a third smallest value corresponding to the at least one item. Because the time interval is not fixedly configured, flexibility of determining the time information is improved. In addition, because all the time information is determined by using the information sent by the terminal device, accuracy of the time information is improved.

In one embodiment, the information includes a correspondence between a subcarrier spacing supported by the terminal device and a first smallest value of the time interval between the downlink scheduling and the downlink data transmission, where one subcarrier spacing corresponds to one first smallest value; and the determining, by the network node based on the information, a first time interval between downlink scheduling and downlink data transmission includes: determining, by the network node, the first time interval based on the first smallest value;

and/or the information includes a correspondence between a subcarrier spacing supported by the terminal device and a second smallest value of the time interval between the downlink data transmission and sending the feedback message by the terminal device after receiving the downlink data, where one subcarrier spacing corresponds to one second smallest value; and the determining, by the network node based on the information, a second time interval between the downlink data transmission and a feedback message sent by the terminal device after the terminal device receives the downlink data includes: determining, by the network node, the second time interval based on the second smallest value;

and/or the information includes a correspondence between a subcarrier spacing supported by the terminal device and a third smallest value of the time interval between the uplink scheduling and the uplink data transmission, where one subcarrier spacing corresponds to one third smallest value; and the determining, by the network node based on the information, a third time interval between uplink scheduling and uplink data transmission includes: determining, by the network node, the third time interval based on the third smallest value.

To be specific, the network node determines at least one of the following based on the information: the first time interval between the downlink scheduling and the downlink data transmission, the second time interval between the downlink data transmission and sending the feedback message by the terminal device after receiving the downlink data, and the third time interval between the uplink scheduling and the uplink data transmission. The information may include the correspondence between the subcarrier spacing supported by the terminal device and the first smallest value, and/or the correspondence between the subcarrier spacing and the second smallest value, and/or the correspondence between the subcarrier spacing and the third smallest value. Because the time interval (time information) is not fixedly configured, flexibility of determining the time information is improved. For example, in the prior art, time relationships corresponding to a terminal device are all at a cell level, and are all fixedly configured; however, in one embodiment of the present disclosure, the time relationships of the terminal device may be determined based on the information sent by the terminal device. Further, because all the time information is determined by using the information sent by the terminal device, accuracy of the time information is improved.

In one embodiment, the information includes a correspondence between an operating band supported by the terminal device and a first smallest value of the time interval between the downlink scheduling and the downlink data transmission, where one operating band corresponds to one first smallest value; and the determining, by the network node based on the information, a first time interval between downlink scheduling and downlink data transmission includes: determining, by the network node, the first time interval based on the first smallest value;

and/or the information includes a correspondence between an operating band supported by the terminal device and a second smallest value of the time interval between the downlink data transmission and sending the feedback message by the terminal device after receiving the downlink data, where one operating band corresponds to one second smallest value; and the determining, by the network node based on the information, a second time interval between the downlink data transmission and a feedback message sent by the terminal device after the terminal device receives the downlink data includes: determining, by the network node, the second time interval based on the second smallest value;

and/or the information includes a correspondence between an operating band supported by the terminal device and a third smallest value of the time interval between the uplink scheduling and the uplink data transmission, where one operating band corresponds to one third smallest value; and the determining, by the network node based on the information, a third time interval between uplink scheduling and uplink data transmission includes: determining, by the network node, the third time interval based on the third smallest value.

To be specific, the network node determines at least one of the following based on the information: the first time interval between the downlink scheduling and the downlink data transmission, the second time interval between the downlink data transmission and sending the feedback message by the terminal device after receiving the downlink data, and the third time interval between the uplink scheduling and the uplink data transmission. The information may include the correspondence between the operating band supported by the terminal device and the first smallest value, and/or the correspondence between the operating band and the second smallest value, and/or the correspondence between the operating band and the third smallest value. Because the time interval (time information) is not fixedly configured, flexibility of determining the time information is improved. In addition, because all the time information is determined by using the information sent by the terminal device, accuracy of the time information is improved.

In one embodiment, the information includes a correspondence between a bandwidth supported by the terminal device and a first smallest value of the time interval between the downlink scheduling and the downlink data transmission, where one bandwidth corresponds to one first smallest value; and the determining, by the network node based on the information, a first time interval between downlink scheduling and downlink data transmission includes: determining, by the network node, the first time interval based on the first smallest value;

and/or the information includes a correspondence between a bandwidth supported by the terminal device and a second smallest value of the time interval between the downlink data transmission and sending the feedback message by the terminal device after receiving the downlink data, where one bandwidth corresponds to one second smallest value; and the determining, by the network node based on the information, a second time interval between the downlink data transmission and a feedback message sent by the terminal device after the terminal device receives the downlink data includes: determining, by the network node, the second time interval based on the second smallest value;

and/or the information includes a correspondence between a bandwidth supported by the terminal device and a third smallest value of the time interval between the uplink scheduling and the uplink data transmission, where one bandwidth corresponds to one third smallest value; and the determining, by the network node based on the information, a third time interval between uplink scheduling and uplink data transmission includes: determining, by the network node, the third time interval based on the third smallest value.

To be specific, the network node determines, based on the information, the first time interval between the downlink scheduling and the downlink data transmission, and/or the second time interval between the downlink data transmission and sending the feedback message by the terminal device after receiving the downlink data, and/or the third time interval. The information may include the correspondence between the bandwidth supported by the terminal device and the first smallest value, and/or the correspondence between the bandwidth and the second smallest value, and/or the information includes the correspondence between the bandwidth supported by the terminal device and the third smallest value of the time interval between the uplink scheduling and the uplink data transmission. Because the time interval (time information) is not fixedly configured, flexibility of determining the time information is improved. In addition, because all the time information is determined by using the information sent by the terminal device, accuracy of the time information is improved.

In one embodiment, the information includes a correspondence between a subcarrier spacing and a bandwidth that are supported by the terminal device and a first smallest value of the time interval between the downlink scheduling and the downlink data transmission, where one subcarrier spacing and one bandwidth correspond to one first smallest value; and the determining, by the network node based on the information, a first time interval between downlink scheduling and downlink data transmission includes: determining, by the network node, the first time interval based on the first smallest value;

and/or the information includes a correspondence between a subcarrier spacing and a bandwidth that are supported by the terminal device and a second smallest value of the time interval between the downlink data transmission and sending the feedback message by the terminal device after receiving the downlink data, where one subcarrier spacing and one bandwidth correspond to one second smallest value; and the determining, by the network node based on the information, a second time interval between the downlink data transmission and a feedback message sent by the terminal device after the terminal device receives the downlink data includes: determining, by the network node, the second time interval based on the second smallest value;

and/or the information includes a correspondence between a subcarrier spacing and a bandwidth that are supported by the terminal device and a third smallest value of the time interval between the uplink scheduling and the uplink data transmission, where one subcarrier spacing and one bandwidth correspond to one third smallest value; and the determining, by the network node based on the information, a third time interval between uplink scheduling and uplink data transmission includes: determining, by the network node, the third time interval based on the third smallest value. Because the time interval (time information) is not fixedly configured, flexibility of determining the time information is improved. In addition, because all the time information is determined by using the information sent by the terminal device, accuracy of the time information is improved.

In one embodiment, the information includes a correspondence between a subcarrier spacing supported by the terminal device and a first time set of the time interval between the downlink scheduling and the downlink data transmission, where one subcarrier spacing corresponds to one first time set; and the determining, by the network node based on the information, a first time interval between downlink scheduling and downlink data transmission includes: determining, by the network node, the first time interval based on the first time set;

and/or the information includes a correspondence between a subcarrier spacing supported by the terminal device and a second time set of the time interval between the downlink data transmission and sending the feedback message by the terminal device after receiving the downlink data, where one subcarrier spacing corresponds to one second time set; and the determining, by the network node based on the information, a second time interval between the downlink data transmission and a feedback message sent by the terminal device after the terminal device receives the downlink data includes: determining, by the network node, the second time interval based on the second time set;

and/or the information includes a correspondence between a subcarrier spacing supported by the terminal device and a third time set of the time interval between the uplink scheduling and the uplink data transmission, where one subcarrier spacing and one bandwidth correspond to one third smallest value, and one subcarrier spacing corresponds to one third time set; and the determining, by the network node based on the information, a third time interval between uplink scheduling and uplink data transmission includes: determining, by the network node, the third time interval based on the third smallest value.

Because the time interval (time information) is not fixedly configured, flexibility of determining the time information is improved. In addition, because all the time information is determined by using the information sent by the terminal device, accuracy of the time information is improved.

The following describes a method for determining time information, where the method is performed by a terminal device. An implementation principle and a technical effect of the method are similar to the foregoing implementation principle and technical effect, and are not described again herein.

According to a second aspect, one embodiment of the present disclosure provides a method for determining time information, where the method includes: sending, by a terminal device, information to a network node, where the information is used by the network node to determine at least one of the following: a first time interval between downlink scheduling and downlink data transmission, a second time interval between the downlink data transmission and a feedback message sent by the terminal device after the terminal device receives the downlink data, and a third time interval between uplink scheduling and uplink data transmission.

In one embodiment, the information includes a correspondence between a subcarrier spacing supported by the terminal device and a first smallest value of the time interval between the downlink scheduling and the downlink data transmission, where one subcarrier spacing corresponds to one first smallest value; and/or the information includes a correspondence between a subcarrier spacing supported by the terminal device and a second smallest value of the time interval between the downlink data transmission and sending the feedback message by the terminal device after receiving the downlink data, where one subcarrier spacing corresponds to one second smallest value; and/or the information includes a correspondence between a subcarrier spacing supported by the terminal device and a third smallest value of the time interval between the uplink scheduling and the uplink data transmission, where one subcarrier spacing corresponds to one third smallest value.

In one embodiment, the information includes a correspondence between an operating band supported by the terminal device and a first smallest value of the time interval between the downlink scheduling and the downlink data transmission, where one subcarrier spacing corresponds to one first smallest value; and/or the information includes a correspondence between an operating band supported by the terminal device and a second smallest value of the time interval between the downlink data transmission and sending the feedback message by the terminal device after receiving the downlink data, where one operating band corresponds to one second smallest value; and/or the information includes a correspondence between an operating band supported by the terminal device and a third smallest value of the time interval between the uplink scheduling and the uplink data transmission, where one operating band corresponds to one third smallest value.

In one embodiment, the information includes a correspondence between a bandwidth supported by the terminal device and a first smallest value of the time interval between the downlink scheduling and the downlink data transmission, where one bandwidth corresponds to one first smallest value; and/or the information includes a correspondence between a bandwidth supported by the terminal device and a second smallest value of the time interval between the downlink data transmission and sending the feedback message by the terminal device after receiving the downlink data, where one bandwidth corresponds to one second smallest value; and/or the information includes a correspondence between a bandwidth supported by the terminal device and a third smallest value of the time interval between the uplink scheduling and the uplink data transmission, where one bandwidth corresponds to one third smallest value.

In one embodiment, the information includes a correspondence between a subcarrier spacing and a bandwidth that are supported by the terminal device and a first smallest value of the time interval between the downlink scheduling and the downlink data transmission, where one subcarrier spacing and one bandwidth correspond to one first smallest value; and/or the information includes a correspondence between a subcarrier spacing and a bandwidth that are supported by the terminal device and a second smallest value of the time interval between the downlink data transmission and sending the feedback message by the terminal device after receiving the downlink data, where one subcarrier spacing and one bandwidth correspond to one second smallest value; and/or the information includes a correspondence between a subcarrier spacing and a bandwidth that are supported by the terminal device and a third smallest value of the time interval between the uplink scheduling and the uplink data transmission, where one subcarrier spacing and one bandwidth correspond to one third smallest value.

In one embodiment, the information includes a correspondence between a subcarrier spacing supported by the terminal device and a first time set of the time interval between the downlink scheduling and the downlink data transmission, where one subcarrier spacing corresponds to one first time set; and/or the information includes a correspondence between a subcarrier spacing supported by the terminal device and a second time set of the time interval between the downlink data transmission and sending the feedback message by the terminal device after receiving the downlink data, where one subcarrier spacing corresponds to one second time set; and/or the information includes a correspondence between a subcarrier spacing supported by the terminal device and a third time set of the time interval between the uplink scheduling and the uplink data transmission, where one subcarrier spacing and one bandwidth correspond to one third smallest value, and one subcarrier spacing corresponds to one third time set.

The following describes a network node, where the network node may be configured to perform the first aspect and an optional manner corresponding to the first aspect. Implementation principles and technical effects thereof are similar, and are not described again herein.

According to a third aspect, one embodiment of the present disclosure provides a network node, including: an obtaining module, configured to obtain information sent by a terminal device; and a determining module, configured to determine at least one of the following based on the information: a first time interval between downlink scheduling and downlink data transmission, a second time interval between the downlink data transmission and a feedback message sent by the terminal device after the terminal device receives the downlink data, and a third time interval between uplink scheduling and uplink data transmission.

In one embodiment, the information includes a correspondence between an operating band supported by the terminal device and a first smallest value of the time interval between the downlink scheduling and the downlink data transmission, where one operating band corresponds to one first smallest value; and the determining module is specifically configured to determine, by the network node, the first time interval based on the first smallest value;

and/or the information includes a correspondence between an operating band supported by the terminal device and a second smallest value of the time interval between the downlink data transmission and sending the feedback message by the terminal device after receiving the downlink data, where one operating band corresponds to one second smallest value; and the determining module is specifically configured to determine the second time interval based on the second smallest value;

and/or the information includes a correspondence between an operating band supported by the terminal device and a third smallest value of the time interval between the uplink scheduling and the uplink data transmission, where one operating band corresponds to one third smallest value; and the determining module is specifically configured to determine the third time interval based on the third smallest value.

In one embodiment, the information includes a correspondence between a bandwidth supported by the terminal device and a first smallest value of the time interval between the downlink scheduling and the downlink data transmission, where one bandwidth corresponds to one first smallest value; and the determining module is specifically configured to determine the first time interval based on the first smallest value;

and/or the information includes a correspondence between a bandwidth supported by the terminal device and a second smallest value of the time interval between the downlink data transmission and sending the feedback message by the terminal device after receiving the downlink data, where one bandwidth corresponds to one second smallest value; and the determining module is specifically configured to determine the second time interval based on the second smallest value;

and/or the information includes a correspondence between a bandwidth supported by the terminal device and a third smallest value of the time interval between the uplink scheduling and the uplink data transmission, where one bandwidth corresponds to one third smallest value; and the determining module is specifically configured to determine the third time interval based on the third smallest value.

In one embodiment, the information includes a correspondence between a subcarrier spacing and a bandwidth that are supported by the terminal device and a first smallest value of the time interval between the downlink scheduling and the downlink data transmission, where one subcarrier spacing and one bandwidth correspond to one first smallest value; and the determining module is specifically configured to determine the first time interval based on the first smallest value;

and/or the information includes a correspondence between a subcarrier spacing and a bandwidth that are supported by the terminal device and a second smallest value of the time interval between the downlink data transmission and sending the feedback message by the terminal device after receiving the downlink data, where one subcarrier spacing and one bandwidth correspond to one second smallest value;

and the determining module is specifically configured to determine the second time interval based on the second smallest value;

and/or the information includes a correspondence between a subcarrier spacing and a bandwidth that are supported by the terminal device and a third smallest value of the time interval between the uplink scheduling and the uplink data transmission, where one subcarrier spacing and one bandwidth correspond to one third smallest value; and the determining module is specifically configured to determine the third time interval based on the third smallest value.

In one embodiment, the information includes a correspondence between a subcarrier spacing supported by the terminal device and a first time set of the time interval between the downlink scheduling and the downlink data transmission, where one subcarrier spacing corresponds to one first time set; and the determining module is specifically configured to determine the first time interval based on the first time set;

and/or the information includes a correspondence between a subcarrier spacing supported by the terminal device and a second time set of the time interval between the downlink data transmission and sending the feedback message by the terminal device after receiving the downlink data, where one subcarrier spacing corresponds to one second time set; and the determining module is specifically configured to determine the second time interval based on the second time set;

and/or the information includes a correspondence between a subcarrier spacing supported by the terminal device and a third time set of the time interval between the uplink scheduling and the uplink data transmission, where one subcarrier spacing and one bandwidth correspond to one third smallest value, and one subcarrier spacing corresponds to one third time set; and the determining module is specifically configured to determine the third time interval based on the third smallest value.

The following describes a terminal device, where the terminal device may be configured to perform the second aspect and an optional manner corresponding to the second aspect. Implementation principles and technical effects thereof are similar, and are not described again herein.

According to a fourth aspect, one embodiment of the present disclosure provides a terminal device, including: a sending module, configured to send information to a network node, where the information is used by the network node to determine at least one of the following: a first time interval between downlink scheduling and downlink data transmission, a second time interval between the downlink data transmission and a feedback message sent by the terminal device after the terminal device receives the downlink data, and a third time interval between uplink scheduling and uplink data transmission.

In one embodiment, the information includes a correspondence between a subcarrier spacing supported by the terminal device and a first smallest value of the time interval between the downlink scheduling and the downlink data transmission, where one subcarrier spacing corresponds to one first smallest value; and/or the information includes a correspondence between a subcarrier spacing supported by the terminal device and a second smallest value of the time interval between the downlink data transmission and sending the feedback message by the terminal device after receiving the downlink data, where one subcarrier spacing corresponds to one second smallest value; and/or the information includes a correspondence between a subcarrier spacing supported by the terminal device and a third smallest value of the time interval between the uplink scheduling and the uplink data transmission, where one subcarrier spacing corresponds to one third smallest value.

In one embodiment, the information includes a correspondence between an operating band supported by the terminal device and a first smallest value of the time interval between the downlink scheduling and the downlink data transmission, where one subcarrier spacing corresponds to one first smallest value; and/or the information includes a correspondence between an operating band supported by the terminal device and a second smallest value of the time interval between the downlink data transmission and sending the feedback message by the terminal device after receiving the downlink data, where one operating band corresponds to one second smallest value; and/or the information includes a correspondence between an operating band supported by the terminal device and a third smallest value of the time interval between the uplink scheduling and the uplink data transmission, where one operating band corresponds to one third smallest value.

In one embodiment, the information includes a correspondence between a bandwidth supported by the terminal device and a first smallest value of the time interval between the downlink scheduling and the downlink data transmission, where one bandwidth corresponds to one first smallest value; and/or the information includes a correspondence between a bandwidth supported by the terminal device and a second smallest value of the time interval between the downlink data transmission and sending the feedback message by the terminal device after receiving the downlink data, where one bandwidth corresponds to one second smallest value; and/or the information includes a correspondence between a bandwidth supported by the terminal device and a third smallest value of the time interval between the uplink scheduling and the uplink data transmission, where one bandwidth corresponds to one third smallest value.

In one embodiment, the information includes a correspondence between a subcarrier spacing and a bandwidth that are supported by the terminal device and a first smallest value of the time interval between the downlink scheduling and the downlink data transmission, where one subcarrier spacing and one bandwidth correspond to one first smallest value; and/or the information includes a correspondence between a subcarrier spacing and a bandwidth that are supported by the terminal device and a second smallest value of the time interval between the downlink data transmission and sending the feedback message by the terminal device after receiving the downlink data, where one subcarrier spacing and one bandwidth correspond to one second smallest value; and/or the information includes a correspondence between a subcarrier spacing and a bandwidth that are supported by the terminal device and a third smallest value of the time interval between the uplink scheduling and the uplink data transmission, where one subcarrier spacing and one bandwidth correspond to one third smallest value.

In one embodiment, the information includes a correspondence between a subcarrier spacing supported by the terminal device and a first time set of the time interval between the downlink scheduling and the downlink data transmission, where one subcarrier spacing corresponds to one first time set; and/or the information includes a correspondence between a subcarrier spacing supported by the terminal device and a second time set of the time interval between the downlink data transmission and sending the feedback message by the terminal device after receiving the downlink data, where one subcarrier spacing corresponds to one second time set; and/or the information includes a correspondence between a subcarrier spacing supported by the terminal device and a third time set of the time interval between the uplink scheduling and the uplink data transmission, where one subcarrier spacing and one bandwidth correspond to one third smallest value, and one subcarrier spacing corresponds to one third time set.

According to a fifth aspect, one embodiment of the present disclosure provides a computer storage medium, configured to store a computer software instruction used by the foregoing network node, where the computer storage medium contains a program designed for executing the first aspect.

According to a sixth aspect, an embodiment of the present disclosure provides a computer storage medium, configured to store a computer software instruction used by the foregoing terminal device, where the computer storage medium contains a program designed for executing the second aspect.

According to a seventh aspect, one embodiment of the present disclosure provides a computer program product, where the computer program product includes an instruction, and when the computer program is executed by a computer, the instruction enables the computer to perform a function performed by the network node in the first aspect and an optional method.

According to an eighth aspect, one embodiment of the present disclosure provides a computer program product, where the computer program product includes an instruction, and when the computer program is executed by a computer, the instruction enables the computer to perform a function performed by the terminal device in the second aspect and an optional method.

According to a ninth aspect, one embodiment of the present disclosure provides a method for determining time information, where the method includes: obtaining, by a terminal device, a rule for determining an uplink time scheduling unit, where the uplink scheduling unit is used to transmit a feedback message; and determining, by the terminal device based on the obtained rule, the uplink time scheduling unit.

According to a tenth aspect, one embodiment of the present disclosure provides a terminal device, including an obtaining module and a determining module, where the obtaining module is configured to obtain a rule for determining an uplink time scheduling unit, where the uplink scheduling unit is used to transmit a feedback message; and the determining module is configured to determine the uplink time scheduling unit according to the obtained rule.

According to an eleventh aspect, an embodiment of the present disclosure provides a computer storage medium, configured to store a computer software instruction used by the foregoing terminal device, where the computer storage medium contains a program designed for executing the ninth aspect.

According to a twelfth aspect, one embodiment of the present disclosure provides a computer program product, where the computer program product includes an instruction, and when the computer program is executed by a computer, the instruction enables the computer to perform a function executed by the terminal device in the ninth aspect.

According to a thirteenth aspect, one embodiment of the present disclosure provides a method for determining time information, where the method includes: sending, by a network node, downlink control information (DCI) to a terminal device, where the DCI is used to indicate a rule for determining an uplink time scheduling unit, and the uplink scheduling unit is used to transmit a feedback message.

According to a fourteenth aspect, one embodiment of the present disclosure provides a network node, including a sending module, configured to send downlink control information (DCI) to a terminal device, where the DCI is used to indicate a rule for determining an uplink time scheduling unit, and the uplink scheduling unit is used to transmit a feedback message.

According to a fifteenth aspect, an embodiment of the present disclosure provides a computer storage medium, configured to store a computer software instruction used by the foregoing terminal device, where the computer storage medium contains a program designed for executing the thirteenth aspect.

According to a sixteenth aspect, one embodiment of the present disclosure provides a computer program product, where the computer program product includes an instruction, and when the computer program is executed by a computer, the instruction enables the computer to perform a function executed by the network node in the thirteenth aspect.

According to a seventeenth aspect, one embodiment of the present disclosure provides a method for determining time information, where the method includes: obtaining, by a terminal device, second smallest values determined in a plurality of manners, where the plurality of manners include at least two of the following: a predefined manner, a SIB signaling indication manner, an RRC signaling indication manner, and a manner of determining a second smallest value based on a minimum processing time of the terminal device; and selecting, by the terminal device, one second smallest value from the second smallest values determined in the plurality of manners.

According to an eighteenth aspect, one embodiment of the present disclosure provides a terminal device, including an obtaining module and a selection module, where the obtaining module is configured to obtain second smallest values determined in a plurality of manners, where the plurality of manners include at least two of the following: a predefined manner, a SIB signaling indication manner, an RRC signaling indication manner, and a manner of determining a second smallest value based on a minimum processing time of the terminal device; and the selection module is configured to select one second smallest value from the second smallest values determined in the plurality of manners.

According to a nineteenth aspect, an embodiment of the present disclosure provides a computer storage medium, configured to store a computer software instruction used by the foregoing terminal device, where the computer storage medium contains a program designed for executing the seventeenth aspect.

According to a twentieth aspect, one embodiment of the present disclosure provides a computer program product, where the computer program product includes an instruction, and when the computer program is executed by a computer, the instruction enables the computer to perform a function executed by the terminal device in the seventeenth aspect.

According to a twenty-first aspect, one embodiment of the present disclosure provides a method for determining time scheduling unit configuration information, where the method includes: obtaining, by a terminal device, time scheduling unit configuration information determined in a plurality of manners, where the plurality of manners include at least two of the following: a SIB signaling indication manner, an RRC signaling indication manner, and an SFI signaling indication manner; and selecting, by the terminal device, a piece of time scheduling unit configuration information from the time scheduling unit configuration information determined in the plurality of manners.

According to a twenty-second aspect, one embodiment of the present disclosure provides a terminal device, including an obtaining module and a selection module, where the obtaining module is configured to obtain time scheduling unit configuration information determined in a plurality of manners, where the plurality of manners include at least two of the following: a SIB signaling indication manner, an RRC signaling indication manner, and an SFI signaling indication manner; and the selection module is configured to select a piece of time scheduling unit configuration information from the time scheduling unit configuration information determined in the plurality of manners.

According to a twenty-third aspect, an embodiment of the present disclosure provides a computer storage medium, configured to store a computer software instruction used by the foregoing terminal device, where the computer storage medium contains a program designed for executing the twenty-first aspect.

According to a twenty-fourth aspect, one embodiment of the present disclosure provides a computer program product, where the computer program product includes an instruction, and when the computer program is executed by a computer, the instruction enables the computer to perform a function executed by the terminal device in the twenty-first aspect.

One embodiment of the present disclosure provides a method for determining time information, a network node, and a terminal device. The method includes: obtaining, by a network node, information sent by a terminal device; and determining, by the network node, at least one of the following based on the information: a first time interval between downlink scheduling and downlink data transmission, a second time interval between the downlink data transmission and a feedback message sent by the terminal device after the terminal device receives downlink data, and a third time interval between uplink scheduling and uplink data transmission, where the information may include at least one of a subcarrier spacing, an operating band, and a bandwidth that are supported by the terminal device, and further include a first smallest value and/or a second smallest value and/or a third smallest value corresponding to the at least one item. Because the time interval (time information) is not fixedly configured, flexibility of determining the time information is improved. In addition, because all the time information is determined by using the information sent by the terminal device, accuracy of the time information is improved.

DESCRIPTION OF DRAWINGS

FIG. 11 is a schematic diagram of distribution of time scheduling units according to an embodiment of the present disclosure;

FIG. 12 is a schematic diagram of distribution of time scheduling units according to an embodiment of the present disclosure;

FIG. 13 is a flowchart of a method for determining time information according to an embodiment of the present disclosure;

DESCRIPTION OF EMBODIMENTS

A network node used in embodiments of the present disclosure may be a base transceiver station (BTS) in a Global System for Mobile Communications (GSM) or Code Division Multiple Access (CDMA), or may be a NodeB (NB) in Wideband Code Division Multiple Access (WCDMA), or may be an evolved NodeB (eNB), an access point (AP), or a relay station in an LTE network, or may be a base station in a 5G network or an NR, or the like, and is not limited herein.

In addition, a terminal device used in the embodiments of the present disclosure may be a device that provides a user with voice and/or data connectivity, for example, may be a handheld device having a wireless connection function, or another processing device connected to a wireless modem. The terminal device may communicate with at least one core network by using a radio access network (RAN). The terminal device may be a mobile terminal, for example, a mobile phone (or referred to as a "cellular" phone), and a computer that has a mobile terminal. For example, the terminal device may be a portable, pocket-sized, handheld, computer-integrated or in-vehicle mobile apparatus, which exchanges voice and/or data with the radio access network. Alternatively, the terminal device may be referred to as a subscriber unit, a subscriber station, a mobile station, a mobile station, a remote station, an access point, a remote terminal, an access terminal, a user terminal, a user agent, or user equipment, and is not limited herein.

In the prior art, because a time relationship between downlink data transmission and a feedback message sent by a terminal device after the terminal device receives the downlink data that is transmitted, and a time relationship between uplink scheduling and uplink data transmission corresponding to the uplink scheduling are both fixedly configured by a base station, the configuration mode is inflexible and the fixedly configured time relationships are inaccurate. To resolve the problems, one embodiment of the present disclosure provides a method and an apparatus for determining time information.

Figure 1:
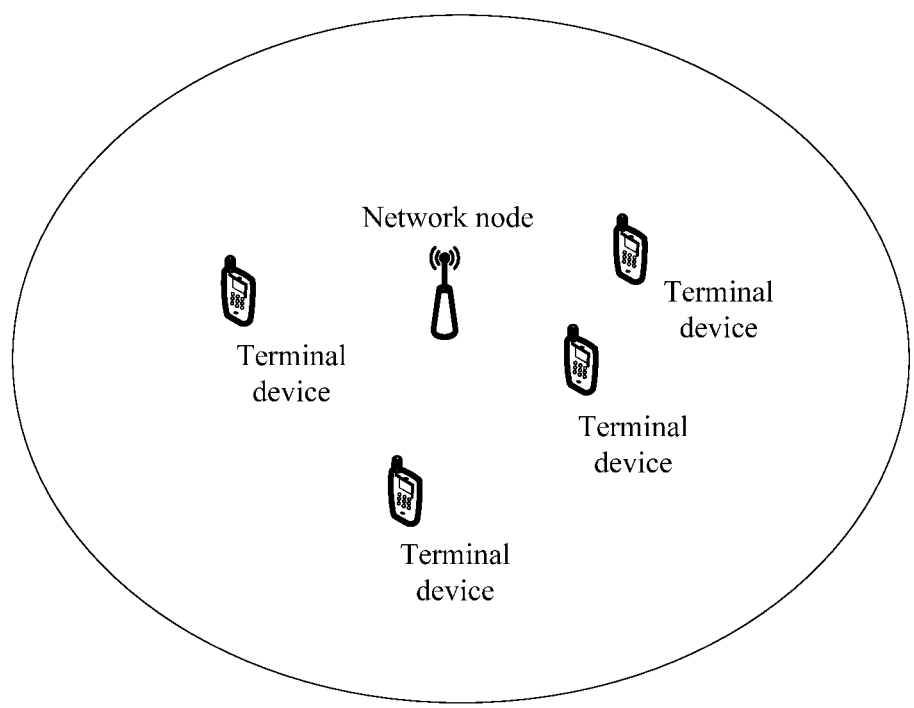
FIG. 1 is a schematic diagram of an application scenario of a method for determining time information according to one embodiment of the present disclosure.

Specifically, FIG. 1 is a schematic diagram of an application scenario of a method for determining time information according to one embodiment of the present disclosure. As shown in FIG. 1, a network node in one embodiment of the present disclosure may perform information transmission with a plurality of terminal devices. One embodiment of the present disclosure mainly describes information transmission between a network node and a terminal device.

Embodiment 1

Figure 2:
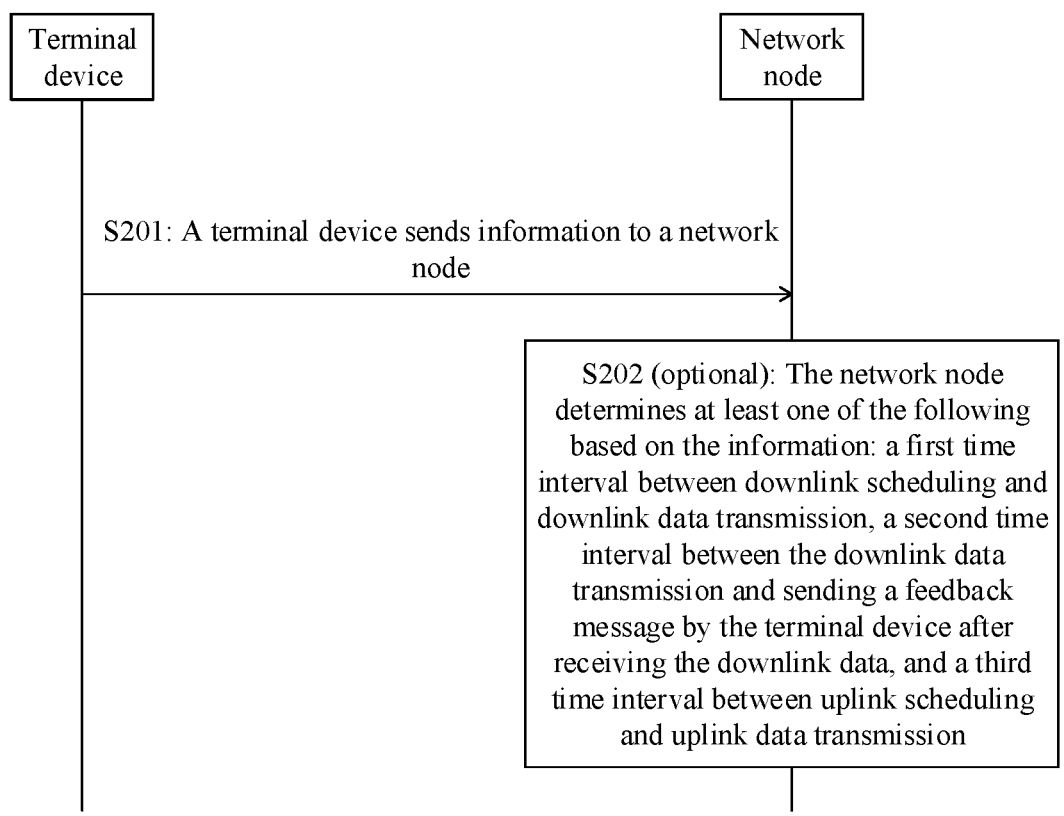
FIG. 2 is an interaction flowchart of a method for determining time information according to an embodiment of the present disclosure.

FIG. 2 is an interaction flowchart of a method for determining time information according to this embodiment of the present disclosure. As shown in FIG. 2, the method includes the following procedure.

Operation S201: A terminal device sends information to a network node.

In one embodiment, the information includes a correspondence between a subcarrier spacing supported by the terminal device and a first smallest value of a time interval between downlink scheduling and downlink data transmission, where one subcarrier spacing corresponds to one first smallest value; and/or the information includes a correspondence between a subcarrier spacing supported by the terminal device and a second smallest value of a time interval between downlink data transmission and a feedback message sent by the terminal device after the terminal device receives downlink data, where one subcarrier spacing corresponds to one second smallest value; and/or the information includes a correspondence between a subcarrier spacing supported by the terminal device and a third smallest value of a time interval between uplink scheduling and uplink data transmission, where one subcarrier spacing corresponds to one third smallest value.

The first smallest value is a smallest value of the time interval between the downlink scheduling and the downlink data transmission. In one embodiment of the present disclosure, a correspondence exists between the downlink scheduling and the scheduled downlink data transmission. To be specific, a purpose of the downlink scheduling is to perform the downlink data transmission. The second smallest value is a smallest value of the time interval between the downlink data transmission and the feedback message sent by the terminal device about the downlink data after the terminal device receives the downlink data. The third smallest value is a smallest value of the time interval between the uplink scheduling and the uplink data transmission corresponding to the uplink scheduling.

It should be noted that, the time interval in one embodiment of the present disclosure is equivalent to a time relationship. For example, the time interval between the downlink scheduling and the downlink data transmission is equivalent to a time relationship between the downlink scheduling and the downlink data transmission.

In one embodiment, the information includes a correspondence between an operating band supported by the terminal device and a first smallest value of a time interval between downlink scheduling and downlink data transmission, where one subcarrier spacing corresponds to one first smallest value; and/or the information includes a correspondence between an operating band supported by the terminal device and a second smallest value of a time interval between downlink data transmission and a feedback message sent by the terminal device after the terminal device receives downlink data, where one operating band corresponds to one second smallest value; and/or the information includes a correspondence between an operating band supported by the terminal device and a third smallest value of a time interval between uplink scheduling and uplink data transmission, where one operating band corresponds to one third smallest value.

In one embodiment, the information includes a correspondence between a bandwidth supported by the terminal device and a first smallest value of a time interval between downlink scheduling and downlink data transmission, where one bandwidth corresponds to one first smallest value; and/or the information includes a correspondence between a bandwidth supported by the terminal device and a second smallest value of a time interval between downlink data transmission and a feedback message sent by the terminal device after the terminal device receives downlink data, where one bandwidth corresponds to one second smallest value; and/or the information includes a correspondence between a bandwidth supported by the terminal device and a third smallest value of a time interval between uplink scheduling and uplink data transmission, where one bandwidth corresponds to one third smallest value.

In one embodiment, the information includes a correspondence between a subcarrier spacing and a bandwidth that are supported by the terminal device and a first smallest value of a time interval between downlink scheduling and downlink data transmission, where one subcarrier spacing and one bandwidth correspond to one first smallest value; and/or the information includes a correspondence between a subcarrier spacing and a bandwidth that are supported by the terminal device and a second smallest value of a time interval between downlink data transmission and a feedback message sent by the terminal device after the terminal device receives downlink data, where one subcarrier spacing and one bandwidth correspond to one second smallest value; and/or the information includes a correspondence between a subcarrier spacing and a bandwidth that are supported by the terminal device and a third smallest value of a time interval between uplink scheduling and uplink data transmission, where one subcarrier spacing and one bandwidth correspond to one third smallest value.

In one embodiment, one subcarrier spacing and one bandwidth may be used as one group of information.

In one embodiment, the information includes a correspondence between a subcarrier spacing supported by the terminal device and an operating band supported by the terminal device and a first smallest value of a time interval between downlink scheduling and downlink data transmission; and/or the information includes a correspondence between a subcarrier spacing supported by the terminal device and an operating band supported by the terminal device and a second smallest value of a time interval between downlink data transmission and a feedback message sent by the terminal device after the terminal device receives downlink data; and/or the information includes a correspondence between a subcarrier spacing supported by the terminal device and an operating band supported by the terminal device and a third smallest value of a time interval between uplink scheduling and the uplink data transmission, where one subcarrier spacing and one operating band correspond to one first smallest value; one subcarrier spacing and one operating band correspond to one second smallest value; and one subcarrier spacing and one operating band correspond to one third smallest value.

In one embodiment, one subcarrier spacing and one operating band may be used as one group of information.

In one embodiment, the information includes a correspondence between a bandwidth supported by the terminal device and an operating band supported by the terminal device and a first smallest value of a time interval between downlink scheduling and downlink data transmission; and/or the information includes a correspondence between a bandwidth supported by the terminal device and an operating band supported by the terminal device and a second smallest value of a time interval between downlink data transmission and a feedback message sent by the terminal device after the terminal device receives downlink data; and/or the information includes a correspondence between a bandwidth supported by the terminal device and an operating band supported by the terminal device and a third smallest value of a time interval between uplink scheduling and uplink data transmission, where one bandwidth and one operating band correspond to one first smallest value; one bandwidth and one operating band correspond to one second smallest value; and one bandwidth and one operating band correspond to one third smallest value.

In one embodiment, one bandwidth and one operating band may be used as one group of information.

In one embodiment, the information includes a correspondence between a bandwidth supported by the terminal device, an operating band supported by the terminal device, and a subcarrier spacing supported by the terminal device, and a first smallest value of a time interval between downlink scheduling and downlink data transmission; and/or the information includes a correspondence between a bandwidth supported by the terminal device, an operating band supported by the terminal device, and a subcarrier spacing supported by the terminal device, and a second smallest value of a time interval between downlink data transmission and a feedback message sent by the terminal device after the terminal device receives downlink data; and/or the information includes a correspondence between a bandwidth supported by the terminal device, an operating band supported by the terminal device, and a subcarrier spacing supported by the terminal device, and a third smallest value of a time interval between uplink scheduling and uplink data transmission, where one bandwidth, one operating band, and one subcarrier spacing correspond to one first smallest value; one bandwidth, one operating band, and one subcarrier spacing correspond to one second smallest value; and one bandwidth, one operating band, and one subcarrier spacing correspond to one third smallest value.

In one embodiment, one bandwidth, one operating band, and one subcarrier spacing may be used as one group of information.

In one embodiment, the information includes a correspondence between a peak data rate supported by the terminal device and a first smallest value of a time interval between downlink scheduling and downlink data transmission, where one peak data rate corresponds to one first smallest value; and/or the information includes a correspondence between a peak data rate supported by the terminal device and a second smallest value of a time interval between downlink data transmission and a feedback message sent by the terminal device after the terminal device receives downlink data, where one peak data rate corresponds to one second smallest value; and/or the information includes a correspondence between a peak data rate supported by the terminal device and a third smallest value of a time interval between uplink scheduling and uplink data transmission, where one peak data rate corresponds to one third smallest value.

In one embodiment, the information includes a correspondence between a largest transport block size (TBS) supported by the terminal device and a first smallest value of a time interval between downlink scheduling and downlink data transmission, where one largest TBS corresponds to one first smallest value; and/or the information includes a correspondence between a largest TBS supported by the terminal device and a second smallest value of a time interval between downlink data transmission and a feedback message sent by the terminal device after the terminal device receives downlink data, where one largest TBS corresponds to one second smallest value; and/or the information includes a correspondence between a largest TBS supported by the terminal device and a third smallest value of a time interval between uplink scheduling and uplink data transmission, where one largest TBS corresponds to one third smallest value.

In one embodiment, the information may further include a correspondence between at least one of a bandwidth, an operating band, a subcarrier spacing, a length of a time scheduling unit, a quantity of symbols of a time scheduling unit, a cyclic prefix (CP) type, a largest TBS, and a peak data rate that are supported by the terminal device, and a first smallest value of a time interval between downlink scheduling and downlink data transmission; and/or the information includes a correspondence between at least one of a bandwidth, an operating band, a subcarrier spacing, a length of a time scheduling unit, a quantity of symbols of a time scheduling unit, a CP type, a largest TBS, and a peak data rate that are supported by the terminal device, and a second smallest value of a time interval between downlink data transmission and a feedback message sent by the terminal device after the terminal device receives downlink data; and/or the information includes a correspondence between at least one of a bandwidth, an operating band, a subcarrier spacing, a length of a time scheduling unit, a quantity of symbols of a time scheduling unit, a CP type, a largest TBS, and a peak data rate that are supported by the terminal device, and a third smallest value of a time interval between uplink scheduling and uplink data transmission.

Operation S202 (optional): The network node determines at least one of the following based on the information: a first time interval between the downlink scheduling and the downlink data transmission, a second time interval between the downlink data transmission and sending the feedback message by the terminal device after receiving the downlink data, and a third time interval between the uplink scheduling and the uplink data transmission.

Specifically, the network node determines the first time interval based on the correspondence between the subcarrier spacing and the first smallest value that is included in the information; or determines the first time interval based on the correspondence between the operating band and the first smallest value that is included in the information; or determines the first time interval based on the correspondence between the bandwidth and the first smallest value that is included in the information; or determines the first time interval based on the correspondence between the peak data rate and the first smallest value that is included in the information; or determines the first time interval based on the correspondence between the largest TBS and the first smallest value that is included in the information; or determines the first time interval based on a correspondence between the first smallest value and any combination of the subcarrier spacing supported by the terminal device, the operating band supported by the terminal device, the bandwidth supported by the terminal device, the length of the time scheduling unit, the quantity of symbols of the time scheduling unit, the CP type, the largest TBS, and the peak data rate.

In the same way, the network node determines the second time interval based on the correspondence between the subcarrier spacing and the second smallest value that is included in the information; or determines the second time interval based on the correspondence between the operating band and the second smallest value that is included in the information; or determines the second time interval based on the correspondence between the bandwidth and the second smallest value that is included in the information; or determines the second time interval based on the correspondence between the peak data rate and the second smallest value that is included in the information; or determines the second time interval based on the correspondence between the largest TBS and the second smallest value that is included in the information; or determines the second time interval based on a correspondence between the second smallest value and any combination of the subcarrier spacing supported by the terminal device, the operating band supported by the terminal device, the bandwidth supported by the terminal device, the length of the time scheduling unit, the quantity of symbols of the time scheduling unit, the CP type, the largest TBS, and the peak data rate.

In the same way, the network node determines the third time interval based on the correspondence between the subcarrier spacing and the third smallest value that is included in the information; or determines the third time interval based on the correspondence between the operating band and the third smallest value that is included in the information; or determines the third time interval based on the correspondence between the bandwidth and the third smallest value that is included in the information; or determines the third time interval based on the correspondence between the peak data rate and the third smallest value that is included in the information; or determines the third time interval based on the correspondence between the largest TBS and the third smallest value that is included in the information; or determines the third time interval based on a correspondence between the third smallest value and any combination of the subcarrier spacing supported by the terminal device, the operating band supported by the terminal device, the bandwidth supported by the terminal device, the length of the time scheduling unit, the quantity of symbols of the time scheduling unit, the CP type, the largest TBS, and the peak data rate.

One embodiment of the present disclosure provides a method for determining time information, where the method includes: a network node obtains information sent by a terminal device; and the network node determines at least one of the following based on the information: a first time interval between downlink scheduling and downlink data transmission, a second time interval between the downlink data transmission and a feedback message sent by the terminal device after the terminal device receives downlink data, and a third time interval between uplink scheduling and uplink data transmission, where the information may include at least one of a subcarrier spacing, an operating band, a bandwidth, a length of a time scheduling unit, a quantity of symbols of a time scheduling unit, a largest TBS, and a peak data rate that are supported by the terminal device, and further include a first smallest value and/or a second smallest value and/or a third smallest value corresponding to the at least one item. Because the time interval (time information) is not fixedly configured, flexibility of determining the time information is improved. In addition, because all the time information is determined by using the information sent by the terminal device, accuracy of the time information is improved.

Further, in one embodiment of the present disclosure, the terminal device may further report a correspondence between a quantity of processes and at least one of the subcarrier spacing, the operating band, the bandwidth, the length of the time scheduling unit, the quantity of symbols of the time scheduling unit, a CP type, the largest TBS, and the peak data rate that are supported by the terminal device. The quantity of processes may be a quantity of processes in the uplink data transmission and/or a quantity of processes in the downlink data transmission.

In addition, the quantity of processes may be derived from the first time interval, the second time interval, the third time interval, and a fourth time interval in one embodiment of the present disclosure, where the fourth time interval is a time interval from receiving the feedback message by the network node to downlink data retransmission. For example, the quantity of processes in the downlink data transmission is equal to a sum of the first time interval, the second time interval, and the fourth time interval. The quantity of processes in the uplink data transmission is equal to the third time interval, a time interval between sending downlink data by the terminal device and sending a feedback message by the network node, and a time interval between sending the feedback message by the network node and decoding the feedback message by the terminal device or scheduling (generally, the time interval is the third time interval).

In addition, a quantity of bits occupied by a process identifier (ID) field carried in downlink control information (DCI) is related to at least one of the subcarrier spacing, the operating band, the bandwidth, the length of the time scheduling unit, the quantity of symbols of the time scheduling unit, the CP type, the peak data rate, the largest TBS, and the like that are supported by the terminal device. For example, assuming that a 15 k subcarrier spacing corresponds 8 processes, and a 60 k subcarrier spacing corresponds to 16 processes, a process ID field in DCI for scheduling 15 k data is three bits, and a process ID field in DCI for scheduling 60 k data is four bits.

With respect to different information sent by the terminal device, the following describes in detail the method for determining time information.

Embodiment 2

Figure 3:
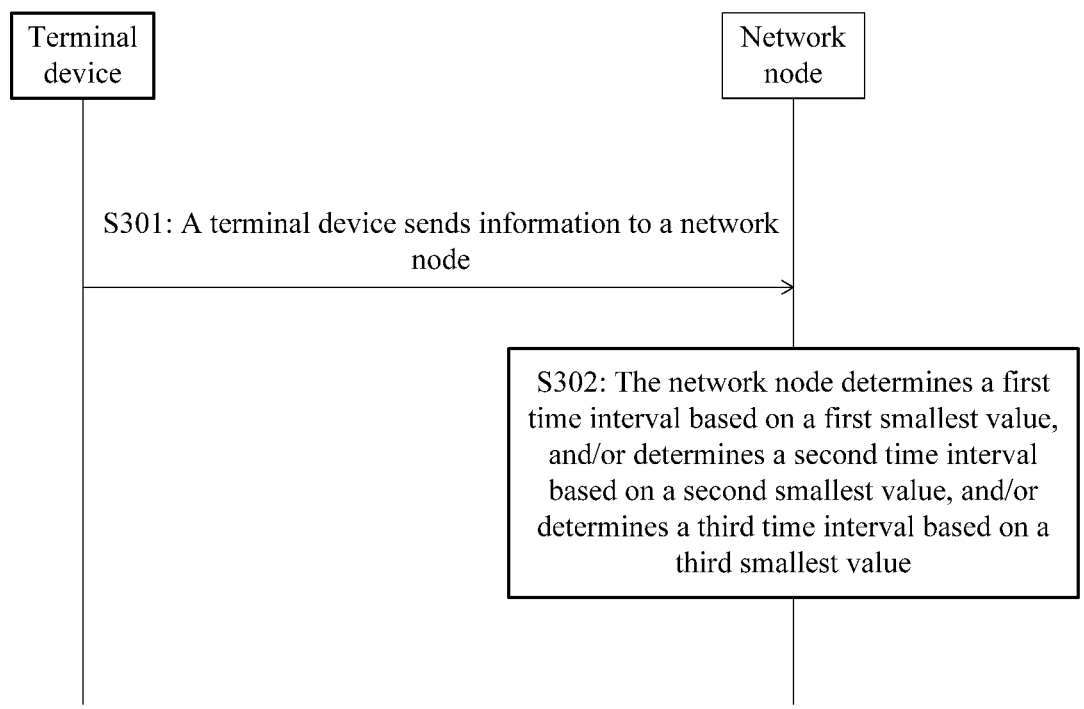
FIG. 3 is an interaction flowchart of a method for determining time information according to another embodiment of the present disclosure.

FIG. 3 is an interaction flowchart of a method for determining time information according to another embodiment of the present disclosure. As shown in FIG. 3, the method includes the following procedure.

Operation S301: A terminal device sends information to a network node. The information includes a correspondence between a subcarrier spacing supported by the terminal device and a first smallest value of a time interval between downlink scheduling and downlink data transmission; and/or the information includes a correspondence between a subcarrier spacing supported by the terminal device and a second smallest value of a time interval between downlink data transmission and a feedback message sent by the terminal device after the terminal device receives the downlink data; and/or the information includes a correspondence between a subcarrier spacing supported by the terminal device and a third smallest value of a time interval between uplink scheduling and uplink data transmission.

Operation S302 (optional): The network node determines the first time interval based on the first smallest value, and/or determines a second time interval based on the second smallest value, and/or determines a third time interval based on the third smallest value.

Specifically, one subcarrier spacing corresponds to one first smallest value. One subcarrier spacing corresponds to one second smallest value. One subcarrier spacing corresponds to one third smallest value. The time interval between the downlink scheduling and the downlink data transmission may be understood as a time relationship between the downlink scheduling and the downlink data transmission. When the downlink scheduling is performed on a time scheduling unit n or a control channel or control information for the downlink scheduling is transmitted on a time scheduling unit n, and the corresponding downlink data transmission is performed on a time scheduling unit n+k, the time interval between the downlink scheduling and the downlink data transmission is k. It should be noted that, the time scheduling unit used in one embodiment of the present disclosure may be one or more slots slot, or one or more mini-slots mini-slot, or a transmission time interval (TTI), or one or more time domain symbols, or the like. This is not described again hereinafter.

Likewise, the time interval between the downlink data transmission and sending the feedback message by the terminal device after receiving the downlink data may be understood as a time relationship between the downlink data transmission and sending the feedback message by the terminal device after receiving the downlink data. When the downlink data transmission is performed on the time scheduling unit n, and sending the feedback message by the terminal device after receiving the downlink data is transmitted on the time scheduling unit n+k, the time interval between the downlink data transmission and the feedback message is k.

Likewise, the time interval between the uplink scheduling and the uplink data transmission may be understood as a time relationship between the uplink scheduling and the uplink data transmission. When the uplink scheduling is performed on the time scheduling unit n or a control channel or control information for the uplink scheduling is transmitted on the time scheduling unit n, and the uplink data transmission corresponding to the scheduling is performed on the time scheduling unit n+k, the time interval between the uplink scheduling and the uplink data transmission is k.

It is assumed that the information includes the correspondence between the subcarrier spacing supported by the terminal device and the first smallest value of the time interval between the downlink scheduling and the downlink data transmission, and the correspondence between the subcarrier spacing supported by the terminal device and the second smallest value of the time interval between the downlink data transmission and sending the feedback message by the terminal device after receiving the downlink data. This is used as an example rather than a limitation. Refer to Table 1.

TABLE 1

| Subcarrier spacing supported by the terminal device (kilohertz (kilohertz, kHz)) | First smallest value | Second smallest value |
|---|---|---|
| 15 | 0 | 0 |
| 30 | 0 | 0 |
| 60 | 1 | 1 |
| 120 | 2 | 1 |
| 240 | 2 | 2 |

After the network node schedules or determines the subcarrier spacing for the terminal device, the network node may determine one first smallest value based on the correspondence between the determined subcarrier spacing and the first smallest value. The first time interval finally determined by the network node only needs to be greater than or equal to the determined first smallest value, and the determined second time interval only needs to be greater than or equal to the determined second smallest value. For example, referring to Table 1, when the subcarrier spacing scheduled by the network node for the terminal device is 15 kHz, both the first smallest value and the second smallest value are 0. In this case, the first time interval only needs to be greater than or equal to 0. Likewise, the second time interval also only needs to be greater than or equal to 0.

It should be noted that, as shown in Table 1, in one embodiment, the first smallest value is proportional to the subcarrier spacing, and the second smallest value is also proportional to the subcarrier spacing. Actually, the foregoing table may include the third smallest value, and the third smallest value is also proportional to the subcarrier spacing. In addition, a time scheduling unit having the first smallest value or the second smallest value in the foregoing table may be one or more slots slot, or one or more mini-slots mini-slot, or a TTI, or one or more time domain symbols, or a subframe, or absolute duration (for example, 1 ms or 0.5 ms), or a quantity of sampling points, or the like. This is also applicable hereinafter, and is not described again.

The first smallest value in the table may be a relative value or may be an absolute value. For example, it is assumed that the time scheduling unit having the first smallest value and the second smallest value is one slot. Based on this, in a row of 60 kHz, the first smallest value 1 may indicate one 60 kHz slot, and in this case, it is an absolute value. Alternatively, the first smallest value 1 may indicate one 15 kHz slot, and in this case, it is a relative value. 15 kHz in this example may be referred to as a reference numerology or a reference subcarrier spacing in a system.

One embodiment of the present disclosure provides a method for determining time information, where the method includes: a network node obtains information sent by a terminal device; and the network node determines at least one of the following based on the information: a first time interval between downlink scheduling and downlink data transmission, a second time interval between the downlink data transmission and a feedback message sent by the terminal device after the terminal device receives downlink data, and a third time interval between uplink scheduling and uplink data transmission, where the information may include a correspondence between a subcarrier spacing supported by the terminal device and a first smallest value, and/or a correspondence between the subcarrier spacing and a second smallest value, and/or a correspondence between the subcarrier spacing and a third smallest value. Because the time interval (time information) is not fixedly configured, flexibility of determining the time information is improved. For example, in the prior art, time relationships corresponding to a terminal device are all at a cell level, and are all fixedly configured; however, in one embodiment of the present disclosure, the time relationships of the terminal device may be determined based on the information sent by the terminal device. Further, because all the time information is determined by using the information sent by the terminal device, accuracy of the time information is improved.

In one embodiment, the information sent by the terminal device further includes a correspondence between a CP type and/or a time scheduling unit and a first smallest value, and/or includes a correspondence between a CP type and/or a time scheduling unit and a second smallest value, and/or includes a correspondence between a CP type and/or a time scheduling unit and a third smallest value.

Embodiment 3

Figure 4:
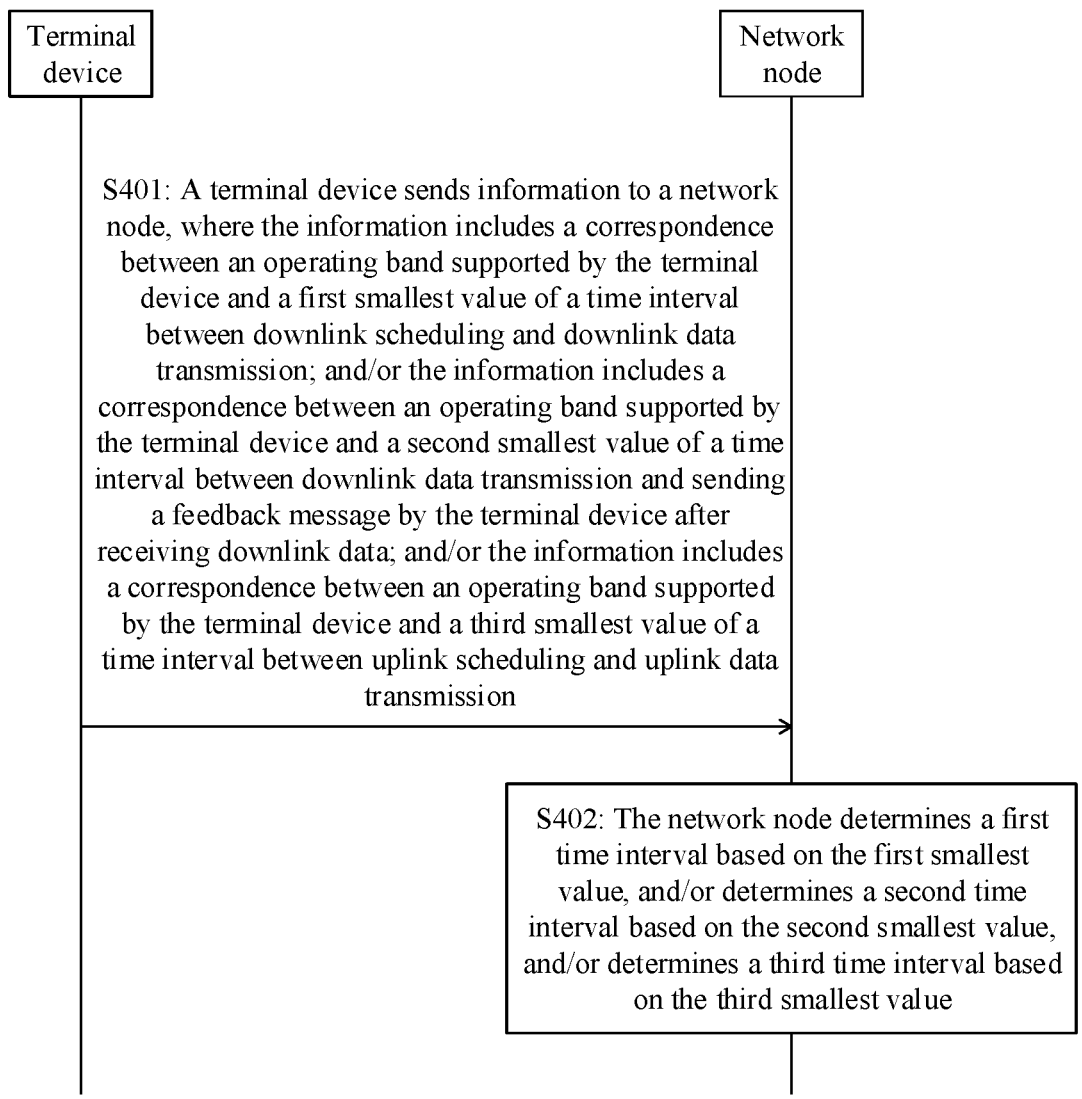
FIG. 4 is an interaction flowchart of a method for determining time information according to still another embodiment of the present disclosure.

FIG. 4 is an interaction flowchart of a method for determining time information according to still another embodiment of the present disclosure. As shown in FIG. 4, the method includes the following procedure.

Operation S401: A terminal device sends information to a network node. The information includes a correspondence between an operating band supported by the terminal device and a first smallest value of a time interval between downlink scheduling and downlink data transmission; and/or the information includes a correspondence between an operating band supported by the terminal device and a second smallest value of a time interval between downlink data transmission and a feedback message sent by the terminal device after the terminal device receives downlink data; and/or the information includes a correspondence between an operating band supported by the terminal device and a third smallest value of a time interval between uplink scheduling and uplink data transmission.

Operation S402 (optional): The network node determines a first time interval based on the first smallest value, and/or determines a second time interval based on the second smallest value, and/or determines a third time interval based on the third smallest value.

Specifically, one operating band corresponds to one first smallest value. One operating band corresponds to one second smallest value. One operating band corresponds to one third smallest value. The time interval between the downlink scheduling and the downlink data transmission may be understood as a time relationship between the downlink scheduling and the downlink data transmission. When the downlink scheduling is performed on a time scheduling unit n, and the corresponding downlink data transmission is performed on a time scheduling unit n+k, the time interval between the downlink scheduling and the downlink data transmission is k.

Likewise, the time interval between the downlink data transmission and sending the feedback message by the terminal device after receiving the downlink data may be understood as a time relationship between the downlink data transmission and sending the feedback message by the terminal device after receiving the downlink data. When the downlink data transmission is performed on the time scheduling unit n, and sending the feedback message by the terminal device after receiving the downlink data is transmitted on the time scheduling unit n+k, the time interval between the downlink data transmission and the feedback message is k.

It is assumed that the information includes the correspondence between the operating band supported by the terminal device and the first smallest value of the time interval between the downlink scheduling and the downlink data transmission, and the correspondence between the operating band supported by the terminal device and the second smallest value of the time interval between the downlink data transmission and sending the feedback message by the terminal device after receiving the downlink data. This is used as an example rather than a limitation. Refer to Table 2.

TABLE 2

| Operating band supported by the terminal device (GHz) | First smallest value | Second smallest value |
| --- | --- | --- |
| 0.7 | 0 | 0 |
| 1.8 | 0 | 0 |
| 3.5 | 1 | 1 |
| 6 | 2 | 1 |
| 28 | 2 | 2 |

After the network node schedules or determines the operating band for the terminal device, the network node may determine one first smallest value based on the correspondence between the determined operating band and the first smallest value. The first time interval finally determined by the network node only needs to be greater than or equal to the determined first smallest value, and the determined second time interval only needs to be greater than or equal to the determined second smallest value. For example, referring to Table 2, when the operating band scheduled by the network node for the terminal device is 3.5 GHz, both the first smallest value and the second smallest value are 1. In this case, the first time interval only needs to be greater than or equal to 1. Likewise, the second time interval also only needs to be greater than or equal to 1.

It should be noted that, as shown in Table 2, the first smallest value is proportional to the operating band. The second smallest value is also proportional to the operating band. Actually, the foregoing table may include the third smallest value, and the third smallest value is also proportional to the operating band.

One embodiment of the present disclosure provides a method for determining time information, where the method includes: a network node obtains information sent by a terminal device; and the network node determines at least one of the following based on the information: a first time interval between downlink scheduling and downlink data transmission, a second time interval between the downlink data transmission and a feedback message sent by the terminal device after the terminal device receives downlink data, and a third time interval between uplink scheduling and uplink data transmission, where the information may include a correspondence between an operating band supported by the terminal device and a first smallest value, and/or a correspondence between the operating band and a second smallest value, and/or a correspondence between the operating band and a third smallest value. Because the time interval (time information) is not fixedly configured, flexibility of determining the time information is improved. In addition, because all the time information is determined by using the information sent by the terminal device, accuracy of the time information is improved.

Embodiment 4

Figure 5:
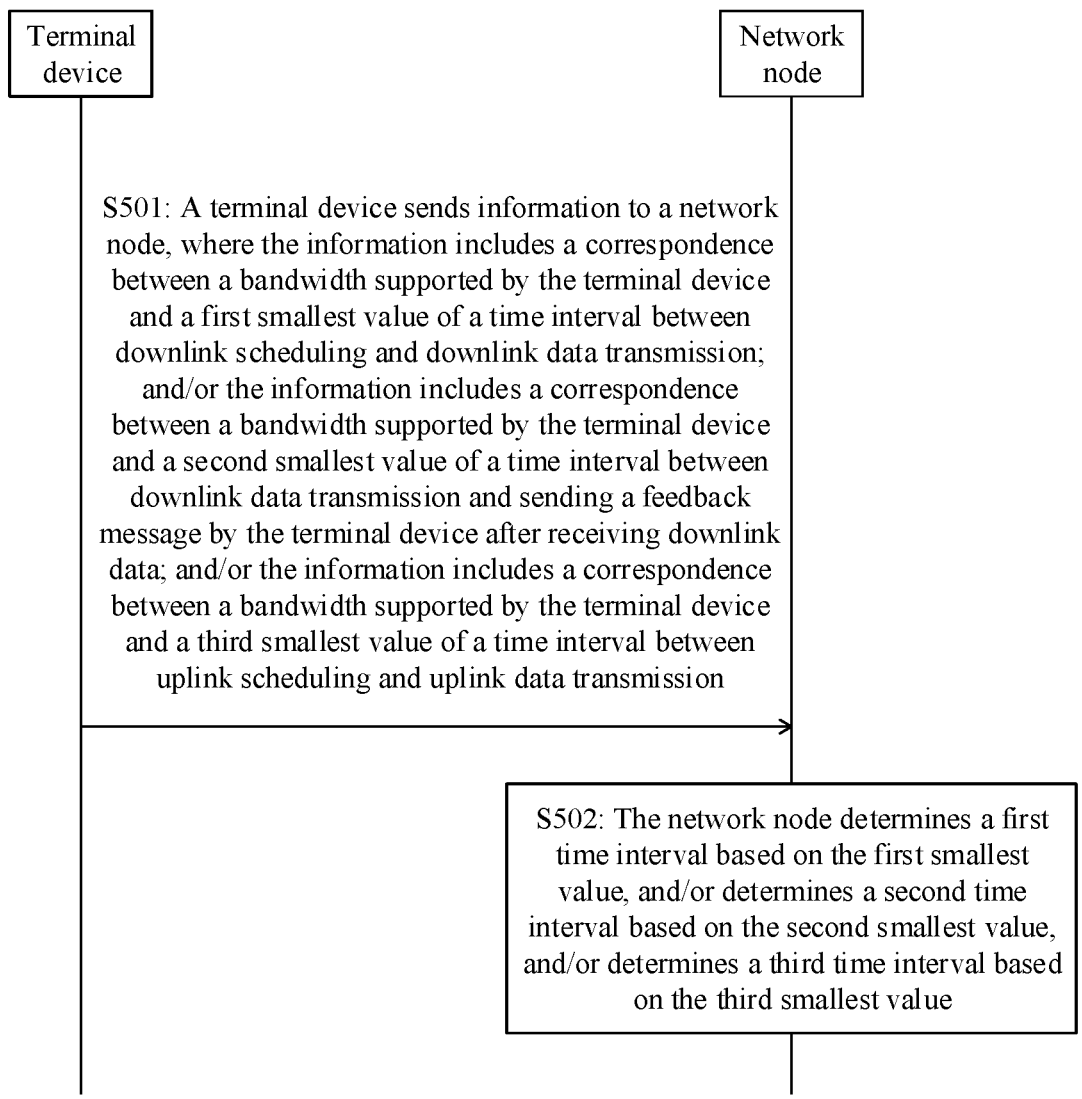
FIG. 5 is an interaction flowchart of a method for determining time information according to still another embodiment of the present disclosure.

FIG. 5 is an interaction flowchart of a method for determining time information according to still another embodiment of the present disclosure. As shown in FIG. 5, the method includes the following procedure.

Operation S501: A terminal device sends information to a network node. The information includes a correspondence between a bandwidth supported by the terminal device and a first smallest value of a time interval between downlink scheduling and downlink data transmission; and/or the information includes a correspondence between a bandwidth supported by the terminal device and a second smallest value of a time interval between downlink data transmission and a feedback message sent by the terminal device after the terminal device receives downlink data; and/or the information includes a correspondence between a bandwidth supported by the terminal device and a third smallest value of a time interval between uplink scheduling and uplink data transmission.

Operation S502 (optional): The network node determines a first time interval based on the first smallest value, and/or determines a second time interval based on the second smallest value, and/or determines a third time interval based on the third smallest value.

Specifically, one bandwidth corresponds to one first smallest value. One bandwidth corresponds to one second smallest value. One bandwidth corresponds to one third smallest value. The time interval between the downlink scheduling and the downlink data transmission may be understood as a time relationship between the downlink scheduling and the downlink data transmission. When the downlink scheduling is performed on a time scheduling unit n, and the corresponding downlink data transmission is performed on a time scheduling unit n+k, the time interval between the downlink scheduling and the downlink data transmission is k.

Likewise, the time interval between the downlink data transmission and sending the feedback message by the terminal device after receiving the downlink data may be understood as a time relationship between the downlink data transmission and sending the feedback message by the terminal device after receiving the downlink data. When the downlink data transmission is performed on the time scheduling unit n+k, and sending the feedback message by the terminal device after receiving the downlink data is transmitted on a time scheduling unit n+2 k, the time interval between the downlink data transmission and the feedback message is k.

It is assumed that the information includes the correspondence between the bandwidth supported by the terminal device and the first smallest value of the time interval between the downlink scheduling and the downlink data transmission, and the correspondence between the bandwidth supported by the terminal device and the second smallest value of the time interval between the downlink data transmission and sending the feedback message by the terminal device after receiving the downlink data. This is used as an example rather than a limitation. Refer to Table 3.

TABLE 3

| Bandwidth supported by the terminal device, in megahertz (Mega Hertz, MHz) | First smallest value | Second smallest value |
| --- | --- | --- |
| 5 | 0 | 0 |
| 10 | 0 | 0 |
| 20 | 1 | 1 |
| 100 | 2 | 1 |
| 400 | 2 | 2 |

After the network node schedules or determines the bandwidth for the terminal device, the network node may determine one first smallest value based on the correspondence between the determined bandwidth and the first smallest value. The first time interval finally determined by the network node only needs to be greater than or equal to the determined first smallest value, and the determined second time interval only needs to be greater than or equal to the determined second smallest value. For example, referring to Table 3, when the bandwidth scheduled by the network node for the terminal device is 20 MHz, both the first smallest value and the second smallest value are 1. In this case, the first time interval only needs to be greater than or equal to 1. Likewise, the second time interval also only needs to be greater than or equal to 1.

It should be noted that, as shown in Table 3, the first smallest value is proportional to the bandwidth. The second smallest value is also proportional to the bandwidth. Actually, the foregoing table may include the third smallest value, and the third smallest value is also proportional to the bandwidth.

One embodiment of the present disclosure provides a method for determining time information, where the method includes: a network node obtains information sent by a terminal device; and the network node determines, based on the information, a first time interval between downlink scheduling and downlink data transmission, and/or a second time interval between downlink data transmission and a feedback message sent by the terminal device after the terminal device receives downlink data, and/or the third time interval, where the information may include a correspondence between a bandwidth supported by the terminal device and a first smallest value, and/or a correspondence between the bandwidth and a second smallest value, and/or the information includes a correspondence between a bandwidth supported by the terminal device and a third smallest value of a time interval between uplink scheduling and uplink data transmission. Because the time interval (time information) is not fixedly configured, flexibility of determining the time information is improved. In addition, because all the time information is determined by using the information sent by the terminal device, accuracy of the time information is improved.

Embodiment 5

Figure 6:
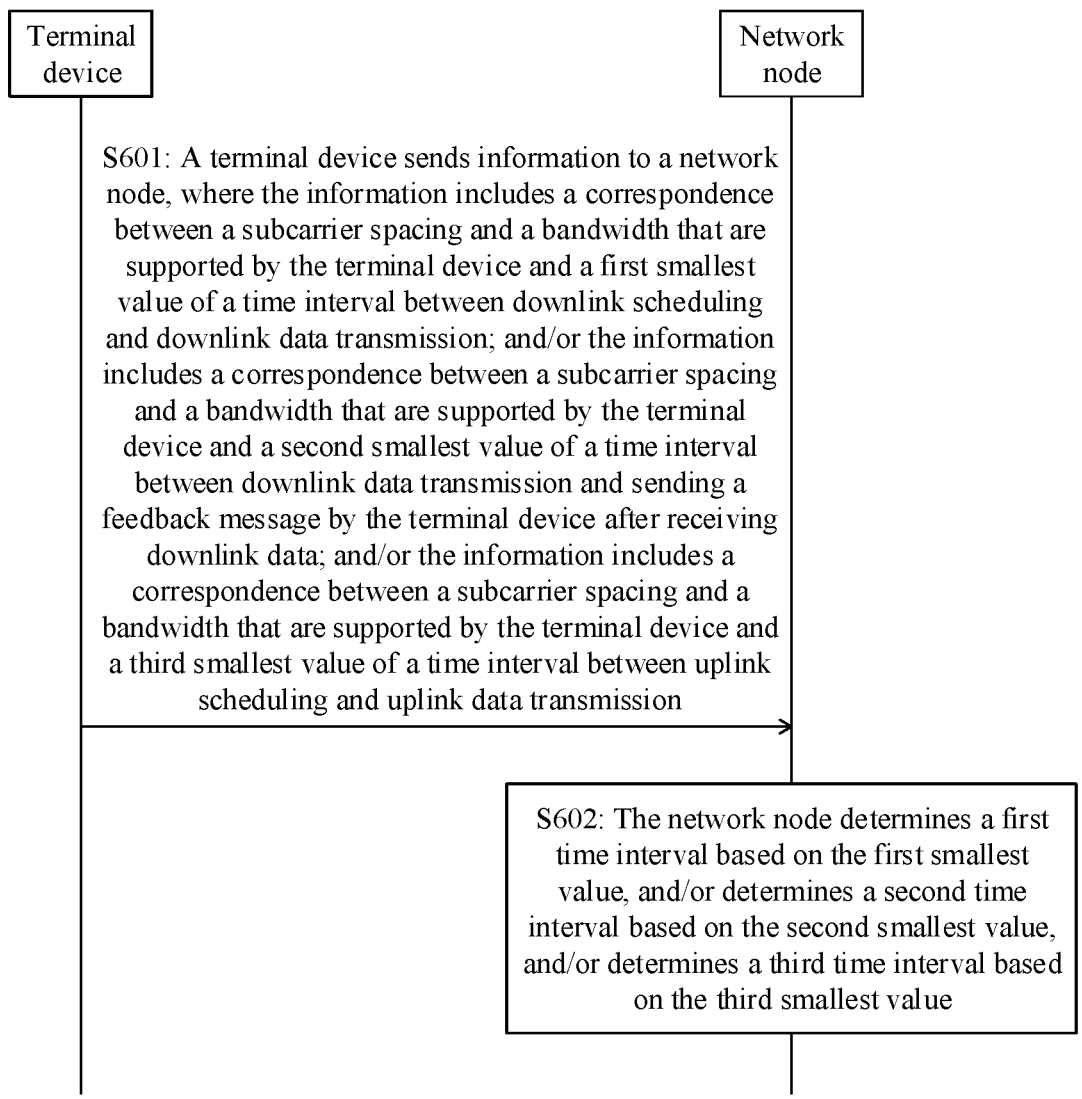
FIG. 6 is an interaction flowchart of a method for determining time information according to still another embodiment of the present disclosure.

FIG. 6 is an interaction flowchart of a method for determining time information according to still another embodiment of the present disclosure. As shown in FIG. 6, the method includes the following procedure.

Operation S601: A terminal device sends information to a network node. The information includes a correspondence between a subcarrier spacing and a bandwidth that are supported by the terminal device and a first smallest value of a time interval between downlink scheduling and downlink data transmission; and/or the information includes a correspondence between a subcarrier spacing and a bandwidth that are supported by the terminal device and a second smallest value of a time interval between downlink data transmission and a feedback message sent by the terminal device after the terminal device receives downlink data; and/or the information includes a correspondence between a subcarrier spacing and a bandwidth that are supported by the terminal device and a third smallest value of a time interval between uplink scheduling and uplink data transmission.

Operation S602 (optional): The network node determines a first time interval based on the first smallest value, and/or determines a second time interval based on the second smallest value, and/or determines a third time interval based on the third smallest value.

Specifically, one subcarrier spacing and one bandwidth correspond to one first smallest value. One subcarrier spacing and one bandwidth correspond to one second smallest value. One subcarrier spacing and one bandwidth correspond to one third smallest value. The time interval between the downlink scheduling and the downlink data transmission may be understood as a time relationship between the downlink scheduling and the downlink data transmission. When the downlink scheduling is performed on a time scheduling unit n, and the corresponding downlink data transmission is performed on a time scheduling unit n+k, the time interval between the downlink scheduling and the downlink data transmission is k.

Likewise, the time interval between the downlink data transmission and sending the feedback message by the terminal device after receiving the downlink data may be understood as a time relationship between the downlink data transmission and sending the feedback message by the terminal device after receiving the downlink data. When the downlink data transmission is performed on the time scheduling unit n+k, and sending the feedback message by the terminal device after receiving the downlink data is transmitted on a time scheduling unit n+2 k, the time interval between the downlink data transmission and the feedback message is k.

It is assumed that the information includes the correspondence between the subcarrier spacing and the bandwidth that are supported by the terminal device and the first smallest value of the time interval between the downlink scheduling and the downlink data transmission, and the correspondence between the subcarrier spacing and the bandwidth that are supported by the terminal device and the second smallest value of the time interval between the downlink data transmission and sending the feedback message by the terminal device after receiving the downlink data. This is used as an example rather than a limitation. Refer to Table 4.

TABLE 4

| Bandwidth supported by the terminal device (MHz) | Subcarrier spacing supported by the terminal device (kHz) | First smallest value | Second smallest value |
|---|---|---|---|
| 20 | 15 | 0 | 0 |
| 20 | 30 | 0 | 0 |
| 100 | 15 | 2 | 2 |
| 100 | 30 | 1 | 1 |
| 100 | 60 | 2 | 2 |

After the network node schedules or determines the bandwidth and the subcarrier spacing for the terminal device, the network node may determine one first smallest value based on the correspondence between the determined bandwidth and subcarrier spacing and the first smallest value. The first time interval finally determined by the network node only needs to be greater than or equal to the determined first smallest value, and the determined second time interval only needs to be greater than or equal to the determined second smallest value. For example, referring to Table 4, when the bandwidth and the subcarrier spacing that are scheduled by the network node for the terminal device are 20 MHz and 30 kHz respectively, both the first smallest value and the second smallest value are 0. In this case, the first time interval only needs to be greater than or equal to 0. Likewise, the second time interval also only needs to be greater than or equal to 0.

It should be noted that, as shown in Table 4, the first smallest value is proportional to the bandwidth. The second smallest value is also proportional to the bandwidth. The first smallest value is proportional to the subcarrier spacing. The second smallest value is also proportional to the subcarrier spacing. Actually, the foregoing table may include the third smallest value, and the third smallest value is also proportional to the bandwidth.

One embodiment of the present disclosure provides a method for determining time information, where the method includes: a network node obtains information sent by a terminal device; and the network node determines, based on the information, a first time interval between downlink scheduling and downlink data transmission, and/or a second time interval between downlink data transmission and a feedback message sent by the terminal device after the terminal device receives downlink data, and/or determines a third time interval based on a third smallest value, where the information may include a correspondence between a bandwidth and a subcarrier spacing that are supported by the terminal device and a first smallest value, and/or a correspondence between the bandwidth and the subcarrier spacing and a second smallest value, and/or a correspondence between the bandwidth and the subcarrier spacing and a third smallest value. Because the time interval (time information) is not fixedly configured, flexibility of determining the time information is improved. In addition, because all the time information is determined by using the information sent by the terminal device, accuracy of the time information is improved.

It should be noted that, in one embodiment of the present disclosure, the network node may further determine the first time interval based on a correspondence between a first smallest value and any combination of a subcarrier spacing supported by the terminal device, an operating band supported by the terminal device, a bandwidth supported by the terminal device, a length of a time scheduling unit, a quantity of symbols of a time scheduling unit, a CP type, a largest TBS, and a peak data rate (which may be included in the information); determine the second time interval based on a correspondence between a second smallest value and any combination of a subcarrier spacing supported by the terminal device, an operating band supported by the terminal device, a bandwidth supported by the terminal device, a length of a time scheduling unit, a quantity of symbols of a time scheduling unit, a CP type, a largest TBS, and a peak data rate; and/or determine the third time interval based on a correspondence between a third smallest value and any combination of a subcarrier spacing supported by the terminal device, an operating band supported by the terminal device, a bandwidth supported by the terminal device, a length of a time scheduling unit, a quantity of symbols of a time scheduling unit, a CP type, a largest TBS, and a peak data rate. The implementation is similar to that in Embodiment 5, and is not described again herein.

Embodiment 6

Figure 7:
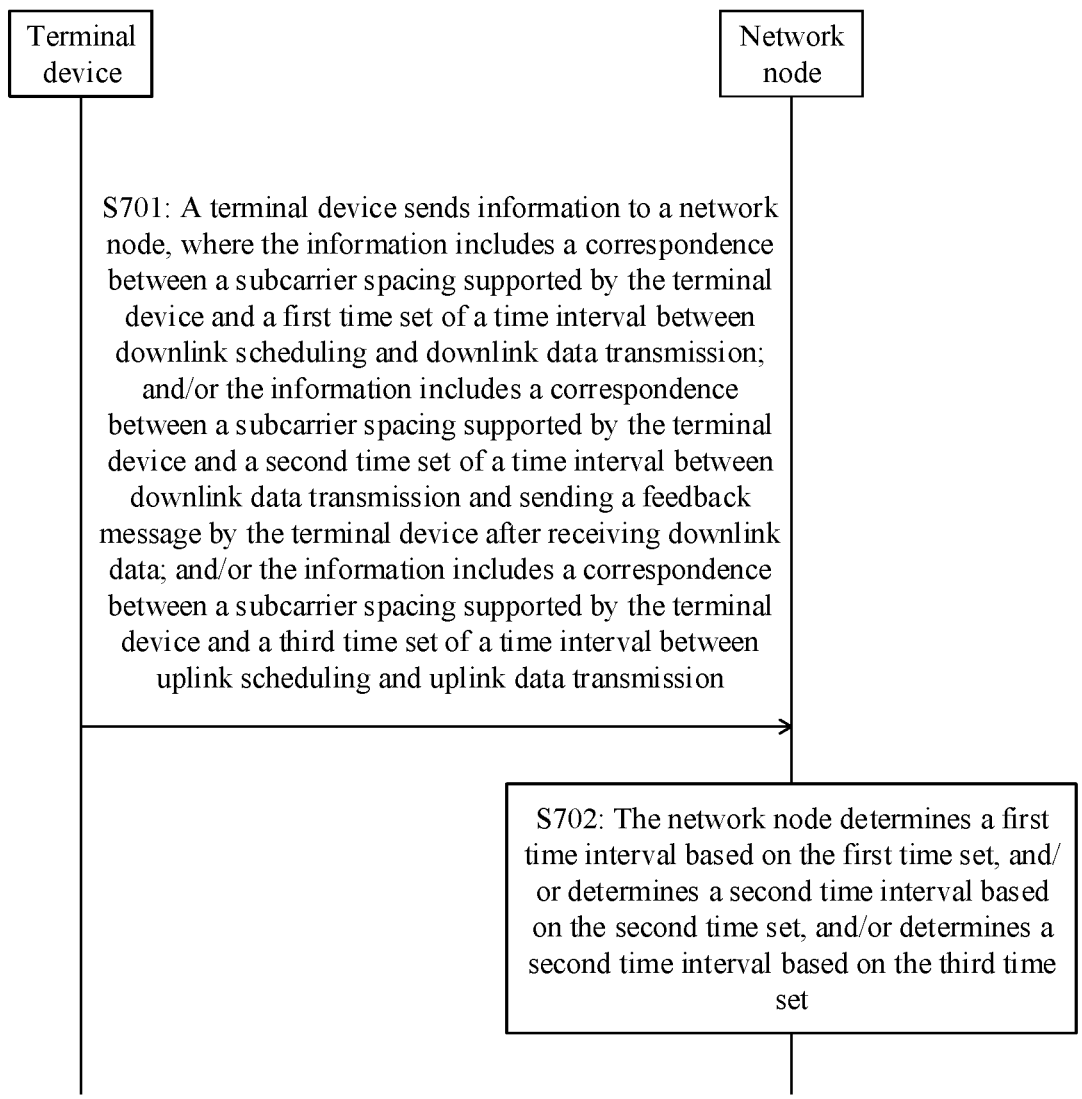
FIG. 7 is an interaction flowchart of a method for determining time information according to still another embodiment of the present disclosure.

FIG. 7 is an interaction flowchart of a method for determining time information according to still another embodiment of the present disclosure. As shown in FIG. 7, the method includes the following procedure.

Operation S701: A terminal device sends information to a network node. The information includes a correspondence between a subcarrier spacing supported by the terminal device and a first time set of a time interval between downlink scheduling and downlink data transmission; and/or the information includes a correspondence between a subcarrier spacing supported by the terminal device and a second time set of a time interval between downlink data transmission and a feedback message sent by the terminal device after the terminal device receives downlink data; and/or the information includes a correspondence between a subcarrier spacing supported by the terminal device and a third time set of a time interval between uplink scheduling and uplink data transmission.

Operation S702 (optional): The network node determines a first time interval based on the first time set, and/or determines a second time interval based on the second time set, and/or determines a second time interval based on the third time set.

One subcarrier spacing corresponds to one first time set. One subcarrier spacing corresponds to one second time set. One subcarrier spacing corresponds to one third time set.

It is assumed that the information includes the correspondence between the subcarrier spacing supported by the terminal device and the first time set of the time interval between the downlink scheduling and the downlink data transmission, and the correspondence between the subcarrier spacing supported by the terminal device and the second time set of the time interval between the downlink data transmission and sending the feedback message by the terminal device after receiving the downlink data. This is used as an example rather than a limitation. Refer to Table 5.

TABLE 5

| Subcarrier spacing supported by the terminal device (kHz) | First time set | Second time set |
| --- | --- | --- |
| 15 | {0, 1} | {0, 1} |
| 30 | {0, 1} | {0, 1} |

TABLE 5-continued

| Subcarrier spacing supported by the terminal device (kHz) | First time set | Second time set |
| --- | --- | --- |
| 60 | {1, 2} | {1, 2} |
| 120 | {2, 3} | {1, 2} |
| 240 | {3, 4} | {3, 4} |

After the network node schedules or determines the subcarrier spacing for the terminal device, the network node may determine one first time set based on the correspondence between the determined subcarrier spacing and the first time set. The first time interval finally determined by the network node only needs to be one in the first time set, and the determined second time interval only needs to be one in the second time set. For example, referring to Table 5, when the subcarrier spacing scheduled by the network node for the terminal device is 15 kHz, both the first time set and the second time set are {0, 1}. In this case, 0 or 1 may be selected for the first time interval. Likewise, 0 or 1 may also be selected for the second time interval.

One embodiment of the present disclosure provides a method for determining time information, where the method includes: a network node obtains information sent by a terminal device; and the network node determines, based on the information, a first time interval between downlink scheduling and downlink data transmission, and/or a second time interval between downlink data transmission and a feedback message sent by the terminal device after the terminal device receives downlink data, and/or a third time interval of a time interval between uplink scheduling and uplink data transmission, where the information includes a correspondence between a subcarrier spacing supported by the terminal device and a first time set of a time interval between downlink scheduling and downlink data transmission, and a correspondence between a subcarrier spacing supported by the terminal device and a second time set of a time interval between downlink data transmission and a feedback message sent by the terminal device after the terminal device receives downlink data, and/or the information includes a correspondence between a subcarrier spacing and a bandwidth that are supported by the terminal device and a third smallest value of a time interval between uplink scheduling and uplink data transmission. Because the time interval (time information) is not fixedly configured, flexibility of determining the time information is improved. In addition, because all the time information is determined by using the information sent by the terminal device, accuracy of the time information is improved.

It should be noted that, in one embodiment of the present disclosure, the network node may further determine the first time interval based on a correspondence between a first time set and any combination of a subcarrier spacing supported by the terminal device, an operating band supported by the terminal device, a bandwidth supported by the terminal device, a quantity of symbols of a time scheduling unit, a CP type, a length of a time scheduling unit, a largest TBS supported by the terminal, and a peak data rate (which may be included in the information); determine the second time interval based on a correspondence between a second time set and any combination of a subcarrier spacing supported by the terminal device, a bandwidth supported by the terminal device, a quantity of symbols of a time scheduling unit, a CP type, a length of a time scheduling unit, a largest TBS supported by the terminal, and a peak data rate; and/or determine the third time interval based on a correspondence between a third time set and any combination of a subcarrier spacing supported by the terminal device, an operating band supported by the terminal device, a bandwidth supported by the terminal device, a quantity of symbols of a time scheduling unit, a CP type, a length of a time scheduling unit, a largest TBS supported by the terminal, and a peak data rate. The implementation is similar to that in Embodiment 6, and is not described again herein.

Embodiment 7

Figure 8:
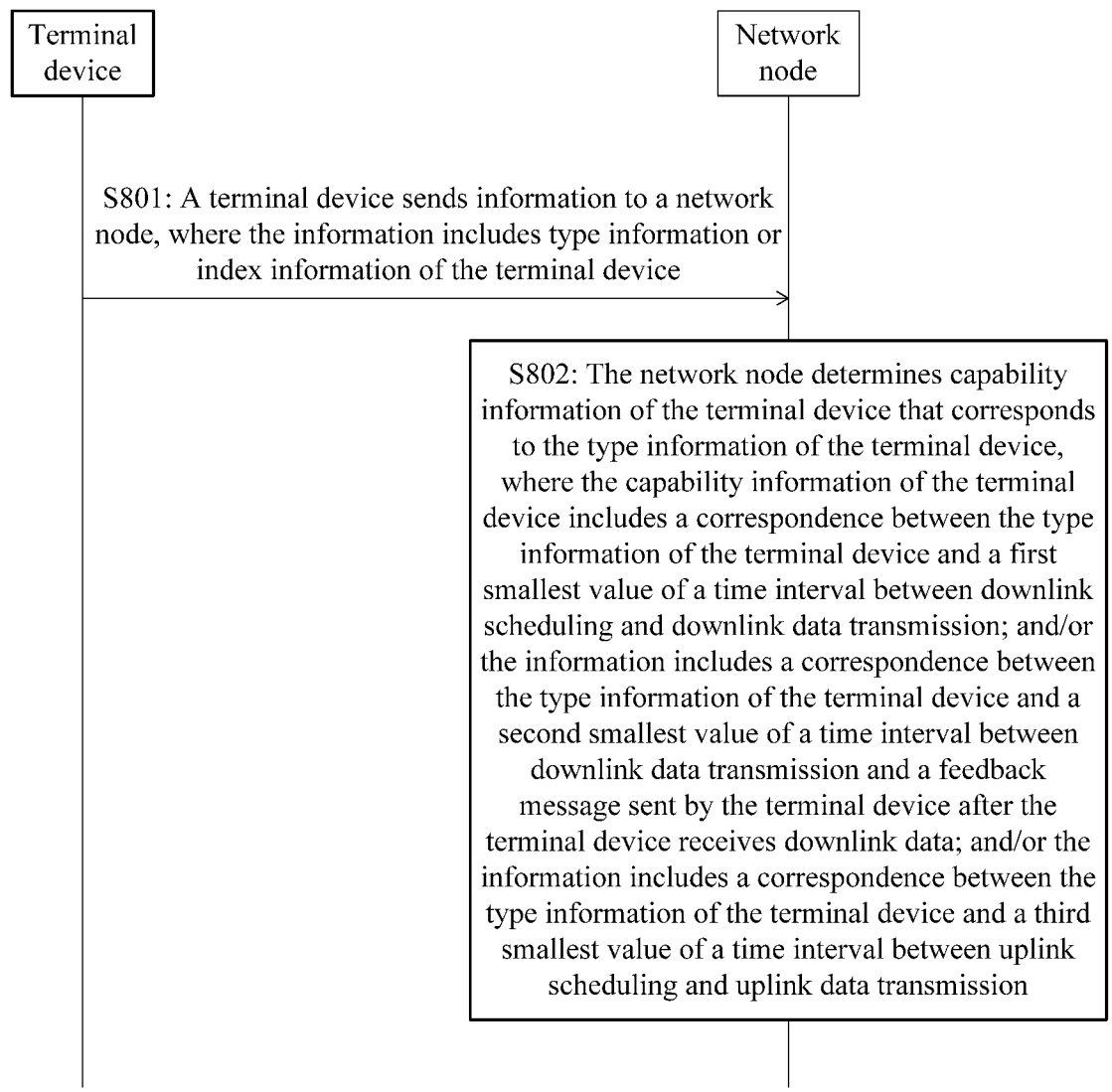
FIG. 8 is an interaction flowchart of a method for determining time information according to still another embodiment of the present disclosure.

FIG. 8 is an interaction flowchart of a method for determining time information according to still another embodiment of the present disclosure. As shown in FIG. 8, the method includes the following procedure.

Operation S801: A terminal device sends information to a network node. The information includes type information or index information of the terminal device.

Operation S802 (optional): The network node determines capability information of the terminal device that corresponds to the type information of the terminal device. The capability information of the terminal device includes a correspondence between the type information of the terminal device and a first smallest value of a time interval between downlink scheduling and downlink data transmission; and/or the information includes a correspondence between the type information of the terminal device and a second smallest value of a time interval between downlink data transmission and a feedback message sent by the terminal device after the terminal device receives downlink data; and/or the information includes a correspondence between the type information of the terminal device and a third smallest value of a time interval between uplink scheduling and uplink data transmission.

In one embodiment, the capability information may further include a correspondence between a first smallest value and any combination of a subcarrier spacing supported by the terminal device, an operating band supported by the terminal device, and a bandwidth supported by the terminal device, and include a correspondence between a second smallest value and any combination of a subcarrier spacing supported by the terminal device, an operating band supported by the terminal device, and a bandwidth supported by the terminal device, and include a correspondence between a third smallest value and any combination of a subcarrier spacing supported by the terminal device, an operating band supported by the terminal device, and a bandwidth supported by the terminal device.

It is assumed that the information includes a correspondence between the type information of the terminal device or reported index information and the subcarrier spacing supported by the terminal device and the first smallest value of the time interval between the downlink scheduling and the downlink data transmission, and the information includes a correspondence between the type information of the terminal device and the subcarrier spacing supported by the terminal device and the second smallest value of the time interval between the downlink data transmission and sending the feedback message by the terminal device after receiving the downlink data. This is used as an example rather than a limitation. Refer to Table 6.

TABLE 6

| Type information or index information of the terminal device | Subcarrier spacing supported by the terminal device (kHz) | First smallest value | Second smallest value |
|---|---|---|---|
| 1 | 15 | 0 | 0 |
|   | 30 | 0 | 0 |
| 2 | 60 | 1 | 1 |
| 3 | 60 | 1 | 1 |
|   | 120 | 2 | 2 |

After the network node schedules or determines the subcarrier spacing for the terminal device, the network node may determine one first time set based on a correspondence between the determined subcarrier spacing and the first time set. A first time interval finally determined by the network node only needs to be one in the first time set, and a determined second time interval only needs to be one in the second time set. For example, referring to Table 5, when the subcarrier spacing scheduled by the network node for the terminal device is 15 kHz, both the first time set and the second time set are {0, 1}. In this case, 0 or 1 may be selected for the first time interval. Likewise, 0 or 1 may also be selected for the second time interval. Likewise, the foregoing table may include a third time set.

One embodiment of the present disclosure provides a method for determining time information, where the method includes: a network node obtains information sent by a terminal device; and the network node determines, based on the information, a first time interval between downlink scheduling and downlink data transmission, and/or a second time interval between downlink data transmission and a feedback message sent by the terminal device after the terminal device receives downlink data, and/or a third time interval of a time interval between uplink scheduling and uplink data transmission, where the information includes type information of the terminal device. Because the time interval (time information) is not fixedly configured, flexibility of determining the time information is improved. In addition, because all the time information is determined by using the information sent by the terminal device, accuracy of the time information is improved. In addition, in this embodiment of the present disclosure, because the terminal device requires only one piece of type information or index information, overheads of the terminal device are reduced.

It should be noted that, in one embodiment of the present disclosure, the network node may further determine the first time interval based on a correspondence between a first time set and any combination of the type information of the terminal device, a supported operating band, a bandwidth supported by the terminal device, a quantity of symbols of a time scheduling unit, a CP type, a length of a time scheduling unit, a largest TBS supported by the terminal device, and a peak data rate (which may be included in the information); determine the second time interval based on a correspondence between a second time set and any combination of the type information of the terminal device, a subcarrier spacing supported by the terminal device, an operating band supported by the terminal device, a bandwidth supported by the terminal device, a quantity of symbols of a time scheduling unit, a CP type, a length of a time scheduling unit, a largest TBS supported by the terminal, and a peak data rate; and/or determine the third time interval based on a correspondence between a third time set and any combination of the type information of the terminal device, a subcarrier spacing supported by the terminal device, an operating band supported by the terminal device, a bandwidth supported by the terminal device, a quantity of symbols of a time scheduling unit, a CP type, a length of a time scheduling unit, a largest TBS supported by the terminal, and a peak data rate. The implementation is similar to that in the foregoing embodiment, and is not described again herein.

In one embodiment, the network node may configure at least one of different first smallest values, second smallest values, third smallest values, first numeric values, second numeric values, third numeric values, first time sets, second time sets, and third time sets for different carriers or different cells. Details are not described again herein.

Embodiment 8

Figure 9:
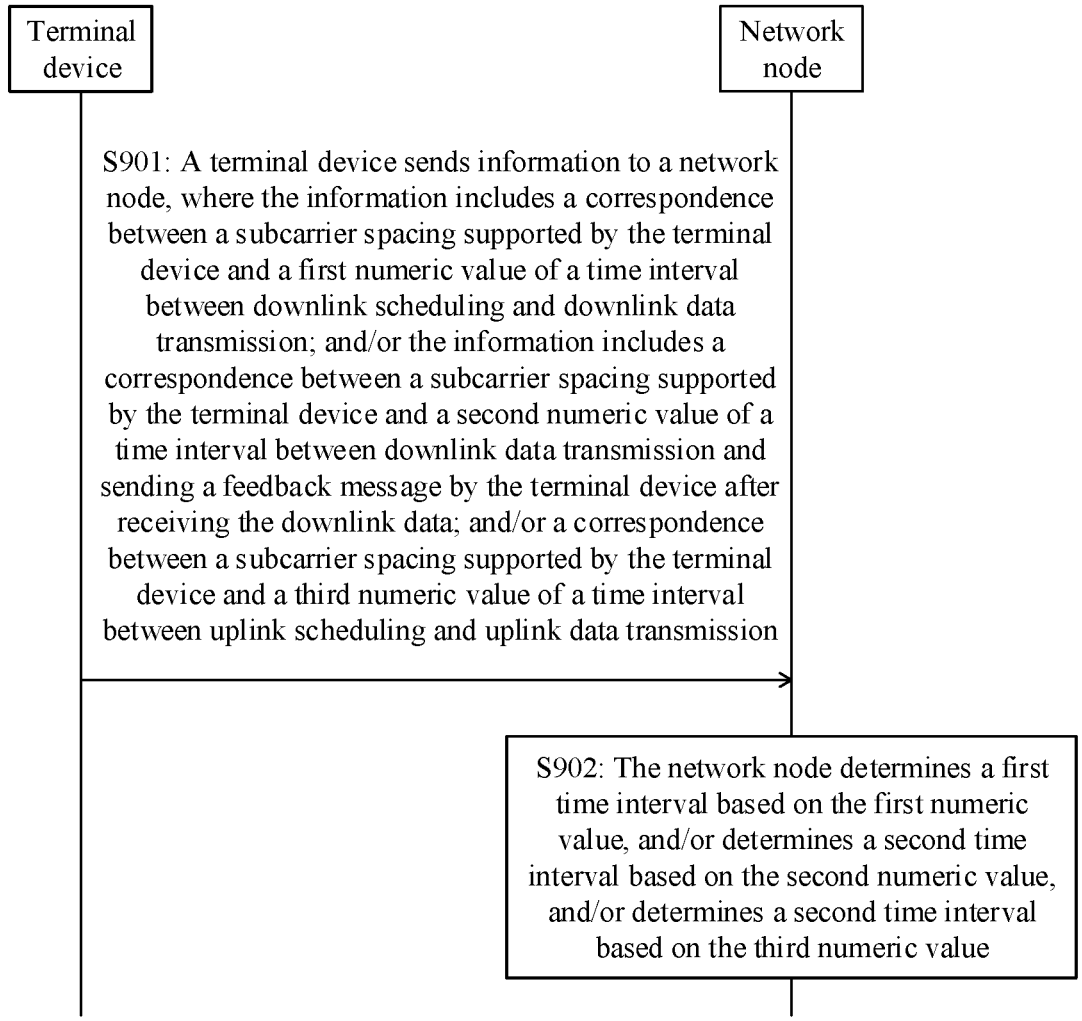
FIG. 9 is an interaction flowchart of a method for determining time information according to still another embodiment of the present disclosure.

FIG. 9 is an interaction flowchart of a method for determining time information according to still another embodiment of the present disclosure. As shown in FIG. 9, the method includes the following procedure.

Operation S901: A terminal device sends information to a network node. The information includes a correspondence between a subcarrier spacing supported by the terminal device and a first numeric value of a time interval between downlink scheduling and downlink data transmission; and/or the information includes a correspondence between a subcarrier spacing supported by the terminal device and a second numeric value of a time interval between downlink data transmission and a feedback message sent by the terminal device after the terminal device receives the downlink data; and/or a correspondence between a subcarrier spacing supported by the terminal device and a third numeric value of a time interval between uplink scheduling and uplink data transmission.

Operation S902 (optional): The network node determines a first time interval based on the first numeric value, and/or determines a second time interval based on the second numeric value, and/or determines a third time interval based on the third numeric value.

The first numeric value indicates whether a smallest value of the time interval between the downlink scheduling and the downlink data transmission may be 0. When the first numeric value indicates that the smallest value may be 0, the first time interval only needs to be greater than or equal to 0. When the first numeric value indicates that the smallest value may not be 0, the first time interval needs to be greater than 0. The first numeric value indicates whether a smallest value of the time interval between the downlink data transmission and sending the feedback message by the terminal device after receiving the downlink data may be 0. When the second numeric value indicates that the smallest value may be 0, the second time interval only needs to be greater than or equal to 0. When the second numeric value indicates that the smallest value may not be 0, the second time interval needs to be greater than 0. When the third numeric value indicates that the smallest value may be 0, the third time interval only needs to be greater than or equal to 0. When the third numeric value indicates that the smallest value may not be 0, the third time interval needs to be greater than 0.

It is assumed that the information includes the correspondence between the subcarrier spacing supported by the terminal device and the first numeric value of the time interval between the downlink scheduling and the downlink data transmission, and the information includes the correspondence between the subcarrier spacing supported by the terminal device and the second numeric value of the time interval between the downlink data transmission and sending the feedback message by the terminal device after receiving the downlink data. This is used as an example rather than a limitation. Refer to Table 7.

TABLE 7

| Subcarrier spacing supported by the terminal device (kHz) | Whether the first numeric value may be 0 | Whether the second numeric value may be 0 |
| --- | --- | --- |
| 15 | Yes | Yes |
| 30 | Yes | Yes |
| 60 | No | No |
| 120 | No | No |
| 240 | No | No |

One embodiment of the present disclosure provides a method for determining time information, where the method includes: a network node obtains information sent by a terminal device; and the network node determines, based on the information, a first time interval between downlink scheduling and downlink data transmission, and/or a second time interval between downlink data transmission and a feedback message sent by the terminal device after the terminal device receives downlink data, and/or a third time interval between uplink scheduling and uplink data transmission, where the information includes a correspondence between a subcarrier spacing supported by the terminal device and a first numeric value of the time interval between the downlink scheduling and the downlink data transmission; and/or the information includes a correspondence between a subcarrier spacing supported by the terminal device and a second numeric value of the time interval between the downlink data transmission and sending the feedback message by the terminal device after receiving the downlink data; and/or the information includes a correspondence between a subcarrier spacing supported by the terminal device and a third numeric value of the time interval between the uplink scheduling and the uplink data transmission. Because the time interval (time information) is not fixedly configured, flexibility of determining the time information is improved. In addition, because all the time information is determined by using the information sent by the terminal device, accuracy of the time information is improved.

In this embodiment, the subcarrier spacing is used as an example. In addition, other factors considered in the foregoing embodiments are similar. For example, a correspondence between at least one of a bandwidth, an operating band, a subcarrier spacing, a length of a time scheduling unit, a quantity of symbols of a time scheduling unit, a CP type, a largest TBS, and a peak data rate that are supported by the terminal device and each of the first numeric value, the second numeric value, and the third numeric value may be considered. It should be noted that, in one embodiment of the present disclosure, the network node may further determine the first time interval based on a correspondence between the first numeric value and any combination of the supported operating band, the bandwidth supported by the terminal device, the quantity of symbols of the time scheduling unit, the CP type, the length of the time scheduling unit, the largest TBS supported by the terminal, and the peak data rate (which may be included in the information); determine the second time interval based on a correspondence between the second numeric value and any combination of the subcarrier spacing supported by the terminal device, the operating band supported by the terminal device, the bandwidth supported by the terminal device, the quantity of symbols of the time scheduling unit, the CP type, the length of the time scheduling unit, the largest TBS supported by the terminal, and the peak data rate; and/or determine the third time interval based on a correspondence between the third numeric value and any combination of the subcarrier spacing supported by the terminal device, the operating band supported by the terminal device, the bandwidth supported by the terminal device, the quantity of symbols of the time scheduling unit, the CP type, the length of the time scheduling unit, the largest TBS supported by the terminal, and the peak data rate. The implementation is similar to that in the foregoing embodiment, and is not described again herein.

It should be noted that, information used in all the foregoing embodiments is sent by the terminal device to the network node. Actually, the information may also be pre-defined in a protocol or stored in the network node and/or the terminal device. The information is optionally stored in a form of a table. The network node and/or terminal device determine/determines the first time interval, the second time interval, and the third time interval directly based on the stored information. The information used in all the foregoing embodiments may also be configured by the network node and/or the terminal device by using signaling. For example, the information is configured by using higher layer radio resource control (RRC) signaling or media access control control element (MAC CE) signaling, or configured by using system information (Master Information Block, MIB) or a system information block (SIB). For example, the information in Table 5 in Embodiment 6 may be configured by the network node. To be specific, the network node may configure one or more first time sets, and/or second time sets, and/or third time sets (or first smallest values, and/or second smallest values, and/or third smallest values; or first numeric values, and/or second numeric values, and/or third numeric values) for the terminal device by using a SIB or RRC signaling, where the network node configures a corresponding first time set, and/or a corresponding second time set, and/or a corresponding third time set for each subcarrier spacing. Alternatively, the network node may configure a corresponding first time set, and/or a corresponding second time set, and/or a corresponding third time set for a quantity of symbols of each time scheduling unit by using a SIB or RRC signaling. Alternatively, the network node may configure a corresponding first time set, and/or a corresponding second time set, and/or a corresponding third time set for a quantity of symbols of each time scheduling unit and each subcarrier spacing by using a SIB or RRC signaling. Other embodiments and considered factors are similar, and are not described again herein.

In addition, in one embodiment of the present disclosure, "supported" by the terminal device may also be "supported" by the system. For example, the subcarrier spacing supported by the terminal device may be a subcarrier spacing supported by the system. The system may include the terminal device and the network node.

In one embodiment, in a carrier aggregation scenario, the network node may configure at least one of different first smallest values, second smallest values, third smallest values, first numeric values, second numeric values, third numeric values, first time sets, second time sets, and third time sets for different carriers or different cells. Details are not described again herein.

In one embodiment, with respect to the first time interval, the second time interval, the third time interval, the first time set, the second time set, and the third time set used in one embodiment of the present disclosure, a time offset offset in dual connectivity in different modes (for example, LTE and 5G) needs to be considered, where a unit of the offset may be the time scheduling unit in one embodiment of the present disclosure. For example, if the second time interval determined by the network node based on a correspondence between the subcarrier spacing and a second smallest value is K1, an actual second time interval is K1+offset or K1−offset. Alternatively, if the second time interval determined by the network node based on a correspondence between the subcarrier spacing and a second smallest value is K1 that already includes an offset, the determined second time interval K1 may be an actual second time interval K1. Similarly, considering switching of a bandwidth part (BP), switch timing return timing exists in a switching process. With respect to the first time interval, the second time interval, the third time interval, the first time set, the second time set, and the third time set used in one embodiment of the present disclosure, similar to the foregoing offset, the return timing needs to be considered. Details are not described again herein.

It should be noted that, the first smallest value, the second smallest value, the third smallest value, the first numeric value, the second numeric value, the third numeric value, values in the first time set, values in the second time set, and values in the third time set in one embodiment of the present disclosure may be default values (for example, a time interval used in an RRC connection reestablishment time period or a time interval used in random access or a time interval used by a DCI indication detected in a common search space, which is generally configured by using a SIB message) configured in the system, or may be flexible dynamic values (configured by using RRC signaling) configured in the system. The values thereof may be specific numeric values, or may be possible smallest values. For example, the network node configures the information in Table 5 in Embodiment 6 for the terminal device by using RRC signaling, where a second time set corresponding to a 60 k subcarrier spacing is $\{1, 2\}$. In a case in which the value is a specific numeric value, if DCI indicates that the second time interval is a first value in the set, and data scheduled by the DCI is transmitted on a time scheduling unit n, the terminal device sends a feedback message on a time scheduling unit n+1. In a case in which the value is a possible smallest value, if DCI indicates that the second time interval is a first value in the set, and data scheduled by the DCI is transmitted on a time scheduling unit n, the terminal device sends a feedback message on a time scheduling unit n+1 or on a first uplink time scheduling unit after a time scheduling unit n+1. The design is mainly applied to a time division duplex (TDD) scenario, because the time scheduling unit n+1 is not necessarily an uplink transmission opportunity. If the time scheduling unit n+1 is a downlink transmission opportunity, the feedback message cannot be sent. The design can reduce signaling overheads.

Embodiment 9

As described above, after a terminal device receives downlink data, the terminal device sends, to a network node, a feedback message corresponding to the downlink data. Considering that the terminal device may use downlink data of different services, based on this, the terminal device has different requirements on latencies and occupied time-frequency resources for sending feedback messages. For example, an ultra-reliable and low latency communication (URLLC) service has a relatively high requirement on a latency. Therefore, after the terminal device receives downlink data of the service, the terminal device may select a nearest available uplink time scheduling unit for sending a feedback message. Conversely, an enhanced mobile broadband (eMBB) service has a relatively low requirement on a latency, but traffic that is transmitted is relatively heavy. Therefore, to prevent congestion, after the terminal device receives downlink data of the service, the terminal device may send a feedback message on a plurality of uplink time scheduling units.

Figure 10:
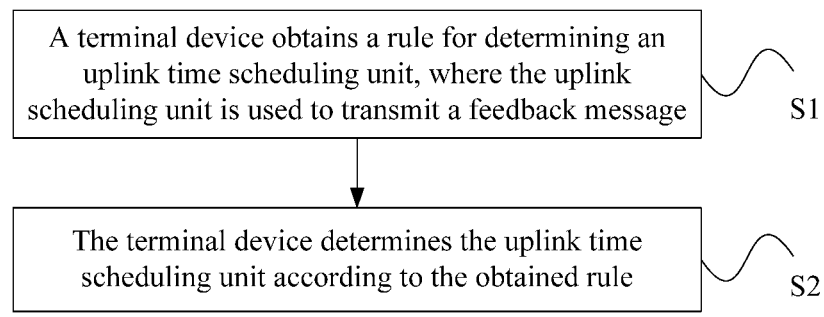
FIG. 10 is a flowchart of a method for determining time information according to an embodiment of the present disclosure.

In conclusion, for downlink data of different services, rules for determining an uplink time scheduling unit also vary, where the uplink scheduling unit is used to transmit a feedback message. Based on this, FIG. 10 is a flowchart of a method for determining time information according to this embodiment of the present disclosure. As shown in FIG. 10, the method includes the following procedure.

Operation S1: A terminal device obtains a rule for determining an uplink time scheduling unit, where the uplink scheduling unit is used to transmit a feedback message.

Operation S2: The terminal device determines the uplink time scheduling unit according to the obtained rule.

Specifically, the terminal device obtains, in at least the following three optional manners, the rule for determining the uplink time scheduling unit.

Optional manner 1: A network node sends DCI to the terminal device, where each DCI format corresponds to at least one rule, and the rule is a rule for determining an uplink time scheduling unit.

For example, when a format of the DCI received by the terminal device is a format 1, the rule obtained by the terminal device for determining an uplink time scheduling unit is a rule 1, and the rule 1 may be that after the terminal device receives downlink data of the service, the terminal device may select a nearest available uplink time scheduling unit for sending a feedback message. The "nearest" indicates a shortest second time interval described in one embodiment of the present disclosure. Specifically, FIG. 11 is a schematic diagram of distribution of time scheduling units according to an embodiment of the present disclosure. The rule 1 is described with reference to FIG. 11. Assuming that a second smallest value of a time interval between downlink data transmission and a feedback message sent by the terminal device after the terminal device receives the downlink data is 3, and that the downlink data is transmitted on an $n^{th}$ time scheduling unit, based on the reason why the terminal device selects a nearest available uplink time scheduling unit for sending a feedback message, the terminal device may send a feedback message on an $(n+k)^{th}$ time scheduling unit, where k satisfies the following conditions:

Condition 1: The $(n+k)^{th}$ time scheduling unit is an uplink time scheduling unit.

Condition 2: k is the smallest one of all numeric values that satisfy the condition 1 and are greater than or equal to 3.

When a format of the DCI received by the terminal device is a format 2, the rule obtained by the terminal device for determining an uplink time scheduling unit is a rule 2. Specifically, FIG. 12 is a schematic diagram of distribution of time scheduling units according to an embodiment of the present disclosure. The rule 2 is described with reference to FIG. 12. Assuming that a second smallest value of a time interval between downlink data transmission and a feedback message sent by the terminal device after the terminal device receives the downlink data is 3, and that the downlink data is transmitted on an $n^{th}$ time scheduling unit, the terminal device may send a feedback message on an $(n+k)^{th}$ time scheduling unit, where k satisfies the following conditions:

Condition 1: The $(n+k)^{th}$ time scheduling unit is an uplink time scheduling unit.

Condition 2: k is the smallest one of all numeric values that satisfy the condition 1 and are greater than or equal to 3.

Condition 3: A quantity of downlink scheduling units corresponding to the $(n+k)^{th}$ time scheduling unit is less than or equal to a quantity of uplink time scheduling units included in a feedback window, where a downlink scheduling unit corresponding to the $(n+k)^{th}$ time scheduling unit means that a feedback message about downlink data transmitted on the downlink scheduling unit is transmitted on the $(n+k)^{th}$ time scheduling unit. The quantity of uplink time scheduling units included in the feedback window is equal to a result obtained by dividing a quantity of downlink time scheduling units for transmitting downlink data, by a quantity of uplink scheduling units and rounding up a quotient.

As shown in FIG. 12, D denotes a downlink time scheduling unit, and U denotes an uplink time scheduling unit. As can be learned, a quantity of downlink time scheduling units is 5, a quantity of uplink scheduling units is 3, and 5 divided by 3 is rounded up to 2. Therefore, the quantity of uplink time scheduling units included in the feedback window should be 2. Therefore, as shown in FIG. 12, a first downlink time scheduling unit and a second downlink time scheduling unit correspond to a first uplink time scheduling unit; a third downlink time scheduling unit and a fourth downlink time scheduling unit correspond to a second uplink time scheduling unit; and a fifth downlink time scheduling unit corresponds to a third uplink time scheduling unit.

Optional manner 2: The terminal device determines a current data scheduling mode of a network node, where each scheduling mode corresponds to at least one rule, and the rule is a rule for determining an uplink time scheduling unit.

For example, the data scheduling mode may be a slot based scheduling mode, or a non-slot based scheduling mode, for example, a mini-slot based scheduling mode. The slot based scheduling mode may correspond to a rule 1, and the non-slot based scheduling mode may correspond to a rule 2.

Optional manner 3: A network node sends DCI to the terminal device, where each piece of DCI includes indication information, the indication information is used to indicate at least one rule, and the rule is a rule for determining an uplink time scheduling unit.

In conclusion, one embodiment of the present disclosure provides a method for determining time information, where the method includes: a terminal device obtains a rule for determining an uplink time scheduling unit; and the terminal device determines the uplink time scheduling unit according to the determined rule. To be specific, for different services, different rules may be determined according to one embodiment of the present disclosure, and the uplink time scheduling unit may be determined according to the rule. Therefore, flexibility of determining time information is improved.

Embodiment 10

A second smallest value described in one embodiment of the present disclosure may be obtained in a plurality of manners, where the plurality of manners include at least two of the following: a predefined manner, a SIB signaling indication manner, an RRC signaling indication manner, and a manner of determining a second smallest value based on a minimum processing time of a terminal device.

The predefined manner means that the second smallest value is defined by a standard protocol.

The SIB signaling indication manner means that the terminal device receives SIB signaling, where the SIB signaling includes the second smallest value or is used to indicate the second smallest value.

The RRC signaling indication manner means that the terminal device receives RRC signaling, where the RRC signaling includes the second smallest value or is used to indicate the second smallest value.

The minimum processing time of the terminal device is a shortest time required by the terminal device for processing downlink data.

Further, if the terminal device supports second smallest values that are obtained in a plurality of different manners, the second smallest values obtained by the terminal device in different manners may be different. For example, second smallest values may be determined in the predefined manner and by using RRC signaling, but a second smallest value in the predefined manner may be different from a second smallest value determined based on the RRC signaling.

Alternatively, second smallest values may be determined by using SIB signaling and RRC signaling, but a second smallest value determined based on the SIB signaling may be different from a second smallest value determined based on the RRC signaling.

Based on this, one embodiment of the present disclosure provides a method for determining a second smallest value. FIG. 13 is a flowchart of a method for determining time information according to this embodiment of the present disclosure. As shown in FIG. 13, the method includes the following procedure.

Operation S3: A terminal device obtains second smallest values determined in a plurality of manners, where the plurality of manners include at least two of the following: a predefined manner, a SIB signaling indication manner, an RRC signaling indication manner, and a manner of determining a second smallest value based on a minimum processing time of the terminal device.

Operation S4: The terminal device selects one second smallest value from the second smallest values determined in the plurality of manners.

When the terminal device obtains second smallest values determined in at least two of the predefined manner, the SIB signaling indication manner, and the manner of determining a second smallest value based on the minimum processing time of the terminal device, the terminal device selects a second smallest value corresponding to any manner as a finally determined second smallest value, or may determine priorities of the foregoing manners, and select a second smallest value corresponding to a manner of a highest priority as a finally determined second smallest value.

Considering that different DCI modes such as fallback DCI and non-fallback DCI may exist when a network node performs data scheduling, where the fallback DCI is mainly used in an RRC reconfiguration process. Therefore, when the network node performs data scheduling by using the fallback DCI, there is a fuzzy period for an RRC configuration, and the RRC configuration is not completed in the fuzzy period. Based on this, if the terminal device obtains a second smallest value determined in the RRC signaling indication manner, and further obtains a second smallest value determined in at least one of the predefined manner, the SIB signaling indication manner, and the manner of determining a second smallest value based on the minimum processing time of the terminal device, the terminal device determines a second smallest value that is determined in fallback DCI scheduling in at least one of the predefined manner, the SIB signaling indication manner, and the manner of determining a second smallest value based on the minimum processing time of the terminal device, or the terminal device determines a second smallest value that is determined in non-fallback DCI scheduling in the RRC signaling indication manner.

When using the second smallest value determined in at least one of the predefined manner, the SIB signaling indication manner, and the manner of determining a second smallest value based on the minimum processing time of the terminal device, the terminal device may select the second smallest value corresponding to any manner as the finally determining second smallest value, or may determine the priorities of the foregoing manners, and select the second smallest value corresponding to the manner of the highest priority as the finally determining second smallest value.

In one embodiment, in different scheduling modes, a second smallest value corresponding to each of the foregoing manners may be different, or may be the same, where the scheduling modes include a slot based scheduling mode and a non-slot based scheduling mode.

In conclusion, when a plurality of manners of determining a second smallest value are included, a second smallest value corresponding to one of the manners may be used as a finally determined second smallest value according to the manner provided by one embodiment of the present disclosure. Therefore, reliability of a communications system is improved.

Embodiment 11

In one embodiment of the present disclosure, time scheduling unit configuration information indicates that a network node configures a type of each time scheduling unit in a time period by using an instruction, where the type is a downlink time scheduling unit, an uplink time scheduling unit, or a flexible (or reserved or unknown) time scheduling unit. Considering that the time scheduling unit configuration information may be obtained in a plurality of manners, where the plurality of manners include at least two of the following: a SIB signaling indication manner, an RRC signaling indication manner, and a slot format indicator (SFI) signaling indication manner. The SIB signaling is based on a cell-specific configuration, the RRC signaling is based on a terminal device configuration, and the SFI signaling is dynamic physical layer signaling.

Figure 14:
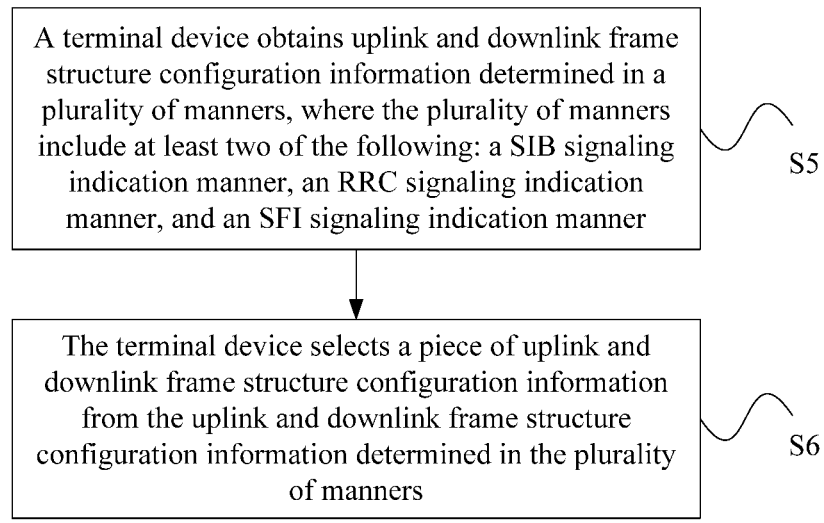
FIG. 14 is a flowchart of a method for determining time scheduling unit configuration information according to an embodiment of the present disclosure.

Further, time scheduling unit configuration information obtained by a terminal device in different manners may be different. Based on this, one embodiment of the present disclosure provides a method for determining time scheduling unit configuration information. FIG. 14 is a flowchart of a method for determining time scheduling unit configuration information according to this embodiment of the present disclosure. As shown in FIG. 14, the method includes the following procedure.

Operation S5: A terminal device obtains time scheduling unit configuration information determined in a plurality of manners, where the plurality of manners include at least two of the following: a SIB signaling indication manner, an RRC signaling indication manner, and an SFI signaling indication manner.

Operation S6: The terminal device selects a piece of time scheduling unit configuration information from the time scheduling unit configuration information determined in the plurality of manners.

On one hand, fallback DCI is mainly used in an RRC reconfiguration process. Therefore, when a network node performs data scheduling by using the fallback DCI, there is a fuzzy period for an RRC configuration, and the RRC configuration is not completed in the fuzzy period. On the other hand, SFI signaling causes a great change to a calculation result of a feedback codebook, and the SFI signaling is physical layer signaling, but the physical layer signaling may be easily lost. Considering the reasons in these aspects, the terminal device selects final time scheduling unit configuration information in the following manners.

When the plurality of manners are the SIB signaling indication manner and the RRC signaling indication manner, the terminal device determines to use time scheduling unit configuration information indicated by SIB signaling as final time scheduling unit configuration information in fallback DCI scheduling; or the terminal device determines final time scheduling unit configuration information based on both a SIB signaling indication and an RRC signaling indication in non-fallback DCI scheduling. Specifically, cell-level SIB signaling is used to indicate a downlink time scheduling unit, a flexible time scheduling unit, and an uplink time scheduling unit in time domain. Further, a time scheduling unit configuration of the flexible time scheduling unit in the SIB signaling is indicated by using user-level RRC signaling, where the time scheduling unit configuration is used to configure a type of each time scheduling unit in the flexible time scheduling unit, and the type is a downlink time scheduling unit, an uplink time scheduling unit, or a flexible time scheduling unit. The determining final time scheduling unit configuration information based on both a SIB signaling indication and an RRC signaling indication means determining the final time scheduling unit configuration information based on the uplink time scheduling unit and the downlink time scheduling unit configured in the SIB signaling and the RRC signaling.

When the plurality of manners are the SIB signaling indication manner and the SFI signaling indication manner, the terminal device uses time scheduling unit configuration information indicated by SIB signaling as final time scheduling unit configuration information in both fallback DCI scheduling and non-fallback scheduling. It should be noted that, in a design of a feedback rule, a flexible time scheduling unit included in SIB signaling is processed as a downlink time scheduling unit.

When the plurality of manners are the SIB signaling indication manner, the RRC signaling indication manner, and the SFI signaling indication manner, the terminal device determines to use time scheduling unit configuration information indicated by SIB signaling as final time scheduling unit configuration information in fallback DCI scheduling; or the terminal device determines final time scheduling unit configuration information based on a SIB signaling indication and an RRC signaling indication in non-fallback DCI scheduling. Specifically, cell-level SIB signaling is used to indicate a downlink time scheduling unit, a flexible time scheduling unit, and an uplink time scheduling unit in time domain. Further, a time scheduling unit configuration of the flexible time scheduling unit in the SIB signaling is indicated by using user-level RRC signaling, where the time scheduling unit configuration is used to configure a type of each time scheduling unit in the flexible time scheduling unit, and the type is a downlink time scheduling unit, an uplink time scheduling unit, or a flexible time scheduling unit. The determining final time scheduling unit configuration information based on both a SIB signaling indication and an RRC signaling indication means determining the final time scheduling unit configuration information based on the uplink time scheduling unit and the downlink time scheduling unit configured in the SIB signaling and the RRC signaling. In one embodiment, in a design of a feedback rule, a flexible time scheduling unit indicated by final time scheduling unit configuration information may be processed as a downlink time scheduling unit.

In conclusion, when a plurality of manners of determining time scheduling unit configuration information are included, time scheduling unit configuration information corresponding to one of the manners may be used as final time scheduling unit configuration information according to the manner provided by one embodiment of the present disclosure. Therefore, reliability of a communications system is improved.

Embodiment 12

Figure 15:
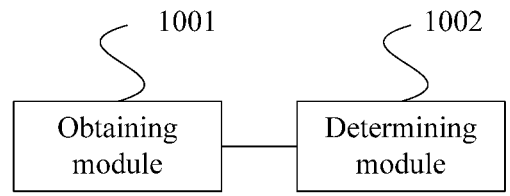
FIG. 15 is a schematic structural diagram of a network node according to an embodiment of the present disclosure.

FIG. 15 is a schematic structural diagram of a network node according to this embodiment of the present disclosure. As shown in FIG. 15, the network node includes:

an obtaining module 1001, configured to obtain information sent by a terminal device; and a determining module 1002, configured to determine at least one of the following based on the information: a first time interval between downlink scheduling and downlink data transmission, a second time interval between the downlink data transmission and a feedback message sent by the terminal device after the terminal device receives the downlink data, and a third time interval between uplink scheduling and uplink data transmission.

The network node provided by this embodiment of the present disclosure may be configured to perform the foregoing action or operation performed by the network node. Implementation principles and technical effects thereof are similar, and are not described again herein.

In one embodiment, the information includes a correspondence between a subcarrier spacing supported by the terminal device and a first smallest value of the time interval between the downlink scheduling and the downlink data transmission, where one subcarrier spacing corresponds to one first smallest value; and the determining module 1002 is specifically configured to:

determine, by the network node, the first time interval based on the first smallest value;

and/or the information includes a correspondence between a subcarrier spacing supported by the terminal device and a second smallest value of the time interval between the downlink data transmission and sending the feedback message by the terminal device after receiving the downlink data, where one subcarrier spacing corresponds to one second smallest value; and the determining module 1002 is specifically configured to:

determine, by the network node, the second time interval based on the second smallest value;

and/or the information includes a correspondence between a subcarrier spacing supported by the terminal device and a third smallest value of the time interval between the uplink scheduling and the uplink data transmission, where one subcarrier spacing corresponds to one third smallest value; and the determining module 1002 is specifically configured to:

determine, by the network node, the third time interval based on the third smallest value.

In one embodiment, the information includes a correspondence between an operating band supported by the terminal device and a first smallest value of the time interval between the downlink scheduling and the downlink data transmission, where one operating band corresponds to one first smallest value; and the determining module 1002 is specifically configured to:

determine, by the network node, the first time interval based on the first smallest value;

and/or the information includes a correspondence between an operating band supported by the terminal device and a second smallest value of the time interval between the downlink data transmission and sending the feedback message by the terminal device after receiving the downlink data, where one operating band corresponds to one second smallest value; and the determining module 1002 is specifically configured to:

determine, by the network node, the second time interval based on the second smallest value;

and/or the information includes a correspondence between an operating band supported by the terminal device and a third smallest value of the time interval between the uplink scheduling and the uplink data transmission, where one operating band corresponds to one third smallest value; and the determining module 1002 is specifically configured to:

determine, by the network node, the third time interval based on the third smallest value.

In one embodiment, the information includes a correspondence between a bandwidth supported by the terminal device and a first smallest value of the time interval between the downlink scheduling and the downlink data transmission, where one bandwidth corresponds to one first smallest value; and the determining module 1002 is specifically configured to:

determine, by the network node, the first time interval based on the first smallest value;

and/or the information includes a correspondence between a bandwidth supported by the terminal device and a second smallest value of the time interval between the downlink data transmission and sending the feedback message by the terminal device after receiving the downlink data, where one bandwidth corresponds to one second smallest value; and the determining module 1002 is specifically configured to:

determine, by the network node, the second time interval based on the second smallest value;

and/or the information includes a correspondence between a bandwidth supported by the terminal device and a third smallest value of the time interval between the uplink scheduling and the uplink data transmission, where one bandwidth corresponds to one third smallest value; and the determining module 1002 is specifically configured to:

determine, by the network node, the third time interval based on the third smallest value.

In one embodiment, the information includes a correspondence between a subcarrier spacing and a bandwidth that are supported by the terminal device and a first smallest value of the time interval between the downlink scheduling and the downlink data transmission, where one subcarrier spacing and one bandwidth correspond to one first smallest value; and the determining module 1002 is specifically configured to:

determine, by the network node, the first time interval based on the first smallest value;

and/or the information includes a correspondence between a subcarrier spacing and a bandwidth that are supported by the terminal device and a second smallest value of the time interval between the downlink data transmission and sending the feedback message by the terminal device after receiving the downlink data, where one subcarrier spacing and one bandwidth correspond to one second smallest value; and the determining module 1002 is specifically configured to:

determine, by the network node, the second time interval based on the second smallest value;

and/or the information includes a correspondence between a subcarrier spacing and a bandwidth that are supported by the terminal device and a third smallest value of the time interval between the uplink scheduling and the uplink data transmission, where one subcarrier spacing and one bandwidth correspond to one third smallest value; and the determining module 1002 is specifically configured to:

determine, by the network node, the third time interval based on the third smallest value.

In one embodiment, the information includes a correspondence between a subcarrier spacing supported by the terminal device and a first time set of the time interval between the downlink scheduling and the downlink data transmission, where one subcarrier spacing corresponds to one first time set; and the determining module 1002 is specifically configured to:

determine, by the network node, the first time interval based on the first time set;

and/or the information includes a correspondence between a subcarrier spacing supported by the terminal device and a second time set of the time interval between the downlink data transmission and sending the feedback message by the terminal device after receiving the downlink data, where one subcarrier spacing corresponds to one second time set; and the determining module 1002 is specifically configured to:

determine, by the network node, the second time interval based on the second time set;

and/or the information includes a correspondence between a subcarrier spacing supported by the terminal device and a third time set of the time interval between the uplink scheduling and the uplink data transmission, where one subcarrier spacing and one bandwidth correspond to one third smallest value, and one subcarrier spacing corresponds to one third time set; and the determining module 1002 is specifically configured to:

determine, by the network node, the third time interval based on the third smallest value.

The network node provided by this embodiment of the present disclosure may be configured to perform the foregoing action or operation performed by the network node.

Implementation principles and technical effects thereof are similar, and are not described again herein.

Embodiment 13

This embodiment of the present disclosure provides a terminal device. The terminal device includes a sending module, configured to send information to a network node, where the information is used by the network node to determine at least one of the following: a first time interval between downlink scheduling and downlink data transmission, a second time interval between the downlink data transmission and a feedback message sent by the terminal device after the terminal device receives the downlink data, and a third time interval between uplink scheduling and uplink data transmission.

In one embodiment, the information includes a correspondence between a subcarrier spacing supported by the terminal device and a first smallest value of the time interval between the downlink scheduling and the downlink data transmission, where one subcarrier spacing corresponds to one first smallest value; and/or the information includes a correspondence between a subcarrier spacing supported by the terminal device and a second smallest value of the time interval between the downlink data transmission and sending the feedback message by the terminal device after receiving the downlink data, where one subcarrier spacing corresponds to one second smallest value; and/or the information includes a correspondence between a subcarrier spacing supported by the terminal device and a third smallest value of the time interval between the uplink scheduling and the uplink data transmission, where one subcarrier spacing corresponds to one third smallest value.

In one embodiment, the information includes a correspondence between an operating band supported by the terminal device and a first smallest value of the time interval between the downlink scheduling and the downlink data transmission, where one subcarrier spacing corresponds to one first smallest value; and/or the information includes a correspondence between an operating band supported by the terminal device and a second smallest value of the time interval between the downlink data transmission and sending the feedback message by the terminal device after receiving the downlink data, where one operating band corresponds to one second smallest value; and/or the information includes a correspondence between an operating band supported by the terminal device and a third smallest value of the time interval between the uplink scheduling and the uplink data transmission, where one operating band corresponds to one third smallest value.

In one embodiment, the information includes a correspondence between a bandwidth supported by the terminal device and a first smallest value of the time interval between the downlink scheduling and the downlink data transmission, where one bandwidth corresponds to one first smallest value; and/or the information includes a correspondence between a bandwidth supported by the terminal device and a second smallest value of the time interval between the downlink data transmission and sending the feedback message by the terminal device after receiving the downlink data, where one bandwidth corresponds to one second smallest value; and/or the information includes a correspondence between a bandwidth supported by the terminal device and a third smallest value of the time interval between the uplink scheduling and the uplink data transmission, where one bandwidth corresponds to one third smallest value.

In one embodiment, the information includes a correspondence between a subcarrier spacing and a bandwidth that are supported by the terminal device and a first smallest value of the time interval between the downlink scheduling and the downlink data transmission, where one subcarrier spacing and one bandwidth correspond to one first smallest value; and/or the information includes a correspondence between a subcarrier spacing and a bandwidth that are supported by the terminal device and a second smallest value of the time interval between the downlink data transmission and sending the feedback message by the terminal device after receiving the downlink data, where one subcarrier spacing and one bandwidth correspond to one second smallest value; and/or the information includes a correspondence between a subcarrier spacing and a bandwidth that are supported by the terminal device and a third smallest value of the time interval between the uplink scheduling and the uplink data transmission, where one subcarrier spacing and one bandwidth correspond to one third smallest value.

In one embodiment, the information includes a correspondence between a subcarrier spacing supported by the terminal device and a first time set of the time interval between the downlink scheduling and the downlink data transmission, where one subcarrier spacing corresponds to one first time set; and/or the information includes a correspondence between a subcarrier spacing supported by the terminal device and a second time set of the time interval between the downlink data transmission and sending the feedback message by the terminal device after receiving the downlink data, where one subcarrier spacing corresponds to one second time set; and/or the information includes a correspondence between a subcarrier spacing supported by the terminal device and a third time set of the time interval between the uplink scheduling and the uplink data transmission, where one subcarrier spacing and one bandwidth correspond to one third smallest value, and one subcarrier spacing corresponds to one third time set.

The terminal device provided by this embodiment of the present disclosure may be configured to perform the foregoing action or operation performed by the terminal device. Implementation principles and technical effects thereof are similar, and are not described again herein.

Embodiment 14

Figure 16:
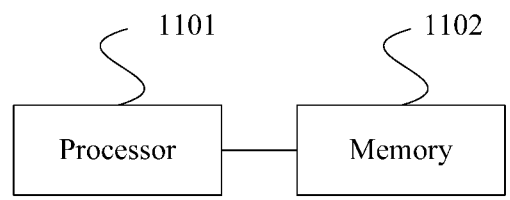
FIG. 16 is a schematic structural diagram of a network node according to another embodiment of the present disclosure.

FIG. 16 is a schematic structural diagram of a network node according to another embodiment of the present disclosure. As shown in FIG. 16, the network node includes:

a processor 1101, configured to obtain information sent by a terminal device, where the processor 1101 is further configured to determine at least one of the following based on the information: a first time interval between downlink scheduling and downlink data transmission, a second time interval between the downlink data transmission and a feedback message sent by the terminal device after the terminal device receives the downlink data, and a third time interval between uplink scheduling and uplink data transmission; and a memory 1102, where the memory 1102 is configured to store an instruction of the processor 1101, so that an operation to be performed by the processor 1101 is performed.

The network node provided by this embodiment of the present disclosure may be configured to perform the foregoing action or operation performed by the network node. Implementation principles and technical effects thereof are similar, and are not described again herein.

In one embodiment, the information includes a correspondence between a subcarrier spacing supported by the terminal device and a first smallest value of the time interval between the downlink scheduling and the downlink data transmission, where one subcarrier spacing corresponds to one first smallest value; and the processor 1101 is specifically configured to:

determine, by the network node, the first time interval based on the first smallest value;

and/or the information includes a correspondence between a subcarrier spacing supported by the terminal device and a second smallest value of the time interval between the downlink data transmission and sending the feedback message by the terminal device after receiving the downlink data, where one subcarrier spacing corresponds to one second smallest value; and the processor 1101 is specifically configured to:

determine, by the network node, the second time interval based on the second smallest value;

and/or the information includes a correspondence between a subcarrier spacing supported by the terminal device and a third smallest value of the time interval between the uplink scheduling and the uplink data transmission, where one subcarrier spacing corresponds to one third smallest value; and the processor 1101 is specifically configured to:

determine, by the network node, the third time interval based on the third smallest value.

In one embodiment, the information includes a correspondence between an operating band supported by the terminal device and a first smallest value of the time interval between the downlink scheduling and the downlink data transmission, where one operating band corresponds to one first smallest value; and the processor 1101 is specifically configured to:

determine, by the network node, the first time interval based on the first smallest value;

and/or the information includes a correspondence between an operating band supported by the terminal device and a second smallest value of the time interval between the downlink data transmission and sending the feedback message by the terminal device after receiving the downlink data, where one operating band corresponds to one second smallest value; and the processor 1101 is specifically configured to:

determine, by the network node, the second time interval based on the second smallest value;

and/or the information includes a correspondence between an operating band supported by the terminal device and a third smallest value of the time interval between the uplink scheduling and the uplink data transmission, where one operating band corresponds to one third smallest value; and the processor 1101 is specifically configured to:

determine, by the network node, the third time interval based on the third smallest value.

In one embodiment, the information includes a correspondence between a bandwidth supported by the terminal device and a first smallest value of the time interval between the downlink scheduling and the downlink data transmission, where one bandwidth corresponds to one first smallest value; and the processor 1101 is specifically configured to:

determine, by the network node, the first time interval based on the first smallest value;

and/or the information includes a correspondence between a bandwidth supported by the terminal device and a second smallest value of the time interval between the downlink data transmission and sending the feedback message by the terminal device after receiving the downlink data, where one bandwidth corresponds to one second smallest value; and the processor 1101 is specifically configured to:

determine, by the network node, the second time interval based on the second smallest value;

and/or the information includes a correspondence between a bandwidth supported by the terminal device and a third smallest value of the time interval between the uplink scheduling and the uplink data transmission, where one bandwidth corresponds to one third smallest value; and the processor 1101 is specifically configured to:

determine, by the network node, the third time interval based on the third smallest value.

In one embodiment, the information includes a correspondence between a subcarrier spacing and a bandwidth that are supported by the terminal device and a first smallest value of the time interval between the downlink scheduling and the downlink data transmission, where one subcarrier spacing and one bandwidth correspond to one first smallest value; and the processor 1101 is specifically configured to:

determine, by the network node, the first time interval based on the first smallest value;

and/or the information includes a correspondence between a subcarrier spacing and a bandwidth that are supported by the terminal device and a second smallest value of the time interval between the downlink data transmission and sending the feedback message by the terminal device after receiving the downlink data, where one subcarrier spacing and one bandwidth correspond to one second smallest value; and the processor 1101 is specifically configured to:

determine, by the network node, the second time interval based on the second smallest value;

and/or the information includes a correspondence between a subcarrier spacing and a bandwidth that are supported by the terminal device and a third smallest value of the time interval between the uplink scheduling and the uplink data transmission, where one subcarrier spacing and one bandwidth correspond to one third smallest value; and the processor 1101 is specifically configured to:

determine, by the network node, the third time interval based on the third smallest value.

In one embodiment, the information includes a correspondence between a subcarrier spacing supported by the terminal device and a first time set of the time interval between the downlink scheduling and the downlink data transmission, where one subcarrier spacing corresponds to one first time set; and the processor 1101 is specifically configured to:
determine, by the network node, the first time interval based on the first time set;
and/or
the information includes a correspondence between a subcarrier spacing supported by the terminal device and a second time set of the time interval between the downlink data transmission and sending the feedback message by the terminal device after receiving the downlink data, where one subcarrier spacing corresponds to one second time set; and
the processor 1101 is specifically configured to:
determine, by the network node, the second time interval based on the second time set;
and/or
the information includes a correspondence between a subcarrier spacing supported by the terminal device and a third time set of the time interval between the uplink scheduling and the uplink data transmission, where one subcarrier spacing and one bandwidth correspond to one third smallest value, and one subcarrier spacing corresponds to one third time set; and
the processor 1101 is specifically configured to:
determine, by the network node, the third time interval based on the third smallest value.

The network node provided by this embodiment of the present disclosure may be configured to perform the foregoing action or operation performed by the network node. Implementation principles and technical effects thereof are similar, and are not described again herein.

Embodiment 15

This embodiment of the present disclosure provides a terminal device. The terminal device includes a transmitter, configured to send information to a network node, where
the information is used by the network node to determine at least one of the following: a first time interval between downlink scheduling and downlink data transmission, a second time interval between the downlink data transmission and a feedback message sent by the terminal device after the terminal device receives the downlink data, and a third time interval between uplink scheduling and uplink data transmission.

In one embodiment, the information includes a correspondence between a subcarrier spacing supported by the terminal device and a first smallest value of the time interval between the downlink scheduling and the downlink data transmission, where one subcarrier spacing corresponds to one first smallest value; and/or
the information includes a correspondence between a subcarrier spacing supported by the terminal device and a second smallest value of the time interval between the downlink data transmission and sending the feedback message by the terminal device after receiving the downlink data, where one subcarrier spacing corresponds to one second smallest value; and/or
the information includes a correspondence between a subcarrier spacing supported by the terminal device and a third smallest value of the time interval between the uplink scheduling and the uplink data transmission, where one subcarrier spacing corresponds to one third smallest value.

In one embodiment, the information includes a correspondence between an operating band supported by the terminal device and a first smallest value of the time interval between the downlink scheduling and the downlink data transmission, where one subcarrier spacing corresponds to one first smallest value; and/or
the information includes a correspondence between an operating band supported by the terminal device and a second smallest value of the time interval between the downlink data transmission and sending the feedback message by the terminal device after receiving the downlink data, where one operating band corresponds to one second smallest value; and/or
the information includes a correspondence between an operating band supported by the terminal device and a third smallest value of the time interval between the uplink scheduling and the uplink data transmission, where one operating band corresponds to one third smallest value.

In one embodiment, the information includes a correspondence between a bandwidth supported by the terminal device and a first smallest value of the time interval between the downlink scheduling and the downlink data transmission, where one bandwidth corresponds to one first smallest value; and/or
the information includes a correspondence between a bandwidth supported by the terminal device and a second smallest value of the time interval between the downlink data transmission and sending the feedback message by the terminal device after receiving the downlink data, where one bandwidth corresponds to one second smallest value; and/or
the information includes a correspondence between a bandwidth supported by the terminal device and a third smallest value of the time interval between the uplink scheduling and the uplink data transmission, where one bandwidth corresponds to one third smallest value.

In one embodiment, the information includes a correspondence between a subcarrier spacing and a bandwidth that are supported by the terminal device and a first smallest value of the time interval between the downlink scheduling and the downlink data transmission, where one subcarrier spacing and one bandwidth correspond to one first smallest value; and/or
the information includes a correspondence between a subcarrier spacing and a bandwidth that are supported by the terminal device and a second smallest value of the time interval between the downlink data transmission and sending the feedback message by the terminal device after receiving the downlink data, where one subcarrier spacing and one bandwidth correspond to one second smallest value; and/or
the information includes a correspondence between a subcarrier spacing and a bandwidth that are supported by the terminal device and a third smallest value of the time interval between the uplink scheduling and the uplink data transmission, where one subcarrier spacing and one bandwidth correspond to one third smallest value.

In one embodiment, the information includes a correspondence between a subcarrier spacing supported by the terminal device and a first time set of the time interval between the downlink scheduling and the downlink data transmission, where one subcarrier spacing corresponds to one first time set; and/or
the information includes a correspondence between a subcarrier spacing supported by the terminal device and a second time set of the time interval between the downlink data transmission and sending the feedback message by the terminal device after receiving the downlink data, where one subcarrier spacing corresponds to one second time set; and/or
the information includes a correspondence between a subcarrier spacing supported by the terminal device and a third time set of the time interval between the uplink scheduling and the uplink data transmission, where one subcarrier spacing and one bandwidth correspond to one third smallest value, and one subcarrier spacing corresponds to one third time set.

The terminal device provided by this embodiment of the present disclosure may be configured to perform the foregoing action or operation performed by the terminal device. Implementation principles and technical effects thereof are similar, and are not described again herein.

Embodiment 16

Figure 17:
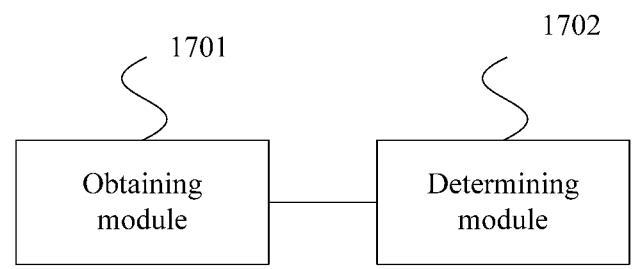
FIG. 17 is a schematic structural diagram of a terminal device according to an embodiment of the present disclosure.

FIG. 17 is a schematic structural diagram of a terminal device according to this embodiment of the present disclosure. As shown in FIG. 17, the terminal device includes:

an obtaining module 1701, configured to obtain a rule for determining an uplink time scheduling unit, where the uplink scheduling unit is used to transmit a feedback message; and a determining module 1702, configured to determine the uplink time scheduling unit according to the obtained rule.

Specifically, the obtaining module 1701 is specifically configured to receive DCI sent by a network node, where each DCI format corresponds to at least one rule, and the rule is a rule for determining an uplink time scheduling unit; or the obtaining module 1701 is specifically configured to determine a current data scheduling mode of a network node, where each scheduling mode corresponds to at least one rule, and the rule is a rule for determining an uplink time scheduling unit; or the obtaining module 1701 is specifically configured to receive DCI sent by a network node, where each piece of DCI includes indication information, the indication information is used to indicate at least one rule, and the rule is a rule for determining an uplink time scheduling unit.

In conclusion, the terminal device provided by one embodiment of the present disclosure is configured to perform the method in Embodiment 9. For content and an effect of the terminal device, refer to the content and the effect in Embodiment 9. Details are not described again herein.

Embodiment 17

One embodiment of the present disclosure provides a network node, including a sending module, configured to send downlink control information (DCI) to a terminal device, where the DCI is used to indicate a rule for determining an uplink time scheduling unit, and the uplink scheduling unit is used to transmit a feedback message.

Optional manner 1: The sending module is specifically configured to send the DCI to the terminal device, where each DCI format corresponds to at least one rule, and the rule is a rule for determining an uplink time scheduling unit.

Optional manner 2: The sending module is specifically configured to send the DCI to the terminal device, where each piece of DCI includes indication information, the indication information is used to indicate at least one rule, and the rule is a rule for determining an uplink time scheduling unit.

The network node provided by one embodiment of the present disclosure is configured to perform the method in Embodiment 9. For content and an effect of the network node, refer to the content and the effect in Embodiment 9. Details are not described again herein.

Embodiment 18

Figure 18:
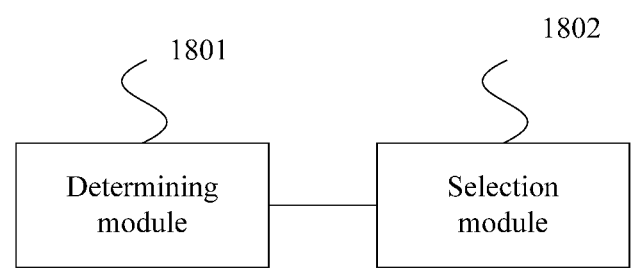
FIG. 18 is a schematic structural diagram of a terminal device according to an embodiment of the present disclosure.

FIG. 18 is a schematic structural diagram of a terminal device according to this embodiment of the present disclosure. As shown in FIG. 18, the terminal device includes:

an obtaining module 1801, configured to obtain second smallest values determined in a plurality of manners, where the plurality of manners include at least two of the following: a predefined manner, a SIB signaling indication manner, an RRC signaling indication manner, and a manner of determining a second smallest value based on a minimum processing time of the terminal device; and a selection module 1802, configured to select one second smallest value from the second smallest values determined in the plurality of manners.

In conclusion, the terminal device provided by one embodiment of the present disclosure is configured to perform the method in Embodiment 10. For content and an effect of the terminal device, refer to the content and the effect in Embodiment 9. Details are not described again herein.

Embodiment 19

Figure 19:
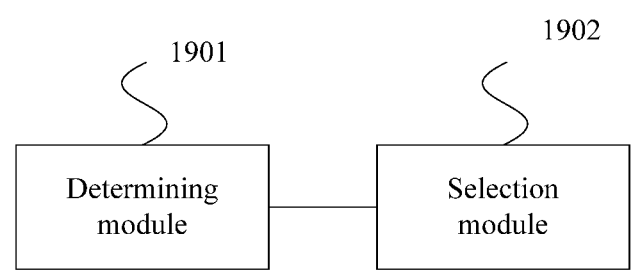
FIG. 19 is a schematic structural diagram of a terminal device according to an embodiment of the present disclosure.

FIG. 19 is a schematic structural diagram of a terminal device according to this embodiment of the present disclosure. As shown in FIG. 19, the terminal device includes:

an obtaining module 1901, configured to obtain time scheduling unit configuration information determined in a plurality of manners, where the plurality of manners include at least two of the following: a SIB signaling indication manner, an RRC signaling indication manner, and an SFI signaling indication manner; and a selection module 1902, configured to select a piece of time scheduling unit configuration information from the time scheduling unit configuration information determined in the plurality of manners.

In conclusion, the terminal device provided by one embodiment of the present disclosure is configured to perform the method in Embodiment 11. For content and an effect of the terminal device, refer to the content and the effect in Embodiment 9. Details are not described again herein.

Embodiment 20

This embodiment of the present disclosure provides a terminal device. The terminal device includes a processor and a memory storing an executable instruction. Therefore, the processor is configured to obtain a rule for determining an uplink time scheduling unit, where the uplink scheduling unit is used to transmit a feedback message; and determine the uplink time scheduling unit according to the determined rule.

Specifically, the processor is specifically configured to obtain DCI sent by a network node, where each DCI format corresponds to at least one rule, and the rule is a rule for determining an uplink time scheduling unit; or the processor is specifically configured to determine a current data scheduling mode of a network node, where each scheduling mode corresponds to at least one rule, and the rule is a rule for determining an uplink time scheduling unit; or the processor is specifically configured to obtain DCI sent by a network node, where each piece of DCI includes indication information, the indication information is used to indicate at least one rule, and the rule is a rule for determining an uplink time scheduling unit.

In conclusion, the terminal device provided by one embodiment of the present disclosure is configured to perform the method in Embodiment 9. For content and an effect of the terminal device, refer to the content and the effect in Embodiment 9. Details are not described again herein.

Embodiment 21

One embodiment of the present disclosure provides a network node, including a transmitter, configured to send downlink control information (DCI) to a terminal device, where the DCI is used to indicate a rule for determining an uplink time scheduling unit, and the uplink scheduling unit is used to transmit a feedback message.

Optional manner 1: The transmitter is specifically configured to send the DCI to the terminal device, where each DCI format corresponds to at least one rule, and the rule is a rule for determining an uplink time scheduling unit.

Optional manner 2: The transmitter is specifically configured to send the DCI to the terminal device, where each piece of DCI includes indication information, the indication information is used to indicate at least one rule, and the rule is a rule for determining an uplink time scheduling unit.

The network node provided by one embodiment of the present disclosure is configured to perform the method in Embodiment 9. For content and an effect of the network node, refer to the content and the effect in Embodiment 9. Details are not described again herein.

Embodiment 22

This embodiment of the present disclosure provides a terminal device. The terminal device includes a processor and a memory storing an executable instruction. Therefore, the processor is configured to obtain second smallest values determined in a plurality of manners, where the plurality of manners include at least two of the following: a predefined manner, a SIB signaling indication manner, an RRC signaling indication manner, and a manner of determining a second smallest value based on a minimum processing time of the terminal device; and select one second smallest value from the second smallest values determined in the plurality of manners.

In conclusion, the terminal device provided by one embodiment of the present disclosure is configured to perform the method in Embodiment 10. For content and an effect of the terminal device, refer to the content and the effect in Embodiment 9. Details are not described again herein.

Embodiment 23

This embodiment of the present disclosure provides a terminal device. The terminal device includes a processor and a memory storing an executable instruction. Therefore, the processor is configured to obtain time scheduling unit configuration information determined in a plurality of manners, where the plurality of manners include at least two of the following: a SIB signaling indication manner, an RRC signaling indication manner, and an SFI signaling indication manner; and select a piece of time scheduling unit configuration information from the time scheduling unit configuration information determined in the plurality of manners.

In conclusion, the terminal device provided by one embodiment of the present disclosure is configured to perform the method in Embodiment 11. For content and an effect of the terminal device, refer to the content and the effect in Embodiment 9. Details are not described again herein.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A method for determining time information, comprising:
   obtaining, by a network node, information sent by a terminal device; and
   determining, by the network node, at least one of the following based on the information: a first time interval between downlink scheduling and downlink data transmission, a second time interval between the downlink data transmission and sending a feedback message by the terminal device after receiving the downlink data, and a third time interval between uplink scheduling and uplink data transmission, wherein the information comprises information related to an operating band and a bandwidth supported by the terminal device.

2. The method according to claim 1, wherein the information comprises a correspondence between a subcarrier spacing supported by the terminal device and a first smallest value of the time interval between the downlink scheduling and the downlink data transmission, wherein one subcarrier spacing corresponds to one first smallest value; and
   the determining, by the network node based on the information, a first time interval between downlink scheduling and downlink data transmission comprises:
   determining, by the network node, the first time interval based on the first smallest value;
   and/or
   the information comprises a correspondence between a subcarrier spacing supported by the terminal device and a second smallest value of the time interval between the downlink data transmission and sending the feedback message by the terminal device after receiving the downlink data, wherein one subcarrier spacing corresponds to one second smallest value; and
   the determining, by the network node based on the information, a second time interval between the downlink data transmission and a feedback message sent by the terminal device after the terminal device receives the downlink data comprises:

determining, by the network node, the second time interval based on the second smallest value; and/or the information comprises a correspondence between a subcarrier spacing supported by the terminal device and a third smallest value of the time interval between the uplink scheduling and the uplink data transmission, wherein one subcarrier spacing corresponds to one third smallest value; and the determining, by the network node based on the information, a third time interval between uplink scheduling and uplink data transmission comprises:

determining, by the network node, the third time interval based on the third smallest value.

3. The method according to claim 1, wherein the information comprises a correspondence between an operating band supported by the terminal device and a first smallest value of the time interval between the downlink scheduling and the downlink data transmission, wherein one operating band corresponds to one first smallest value; and the determining, by the network node based on the information, a first time interval between downlink scheduling and downlink data transmission comprises:

determining, by the network node, the first time interval based on the first smallest value;

and/or the information comprises a correspondence between an operating band supported by the terminal device and a second smallest value of the time interval between the downlink data transmission and sending the feedback message by the terminal device after receiving the downlink data, wherein one operating band corresponds to one second smallest value; and the determining, by the network node based on the information, a second time interval between the downlink data transmission and a feedback message sent by the terminal device after the terminal device receives the downlink data comprises:

determining, by the network node, the second time interval based on the second smallest value; and/or the information comprises a correspondence between an operating band supported by the terminal device and a third smallest value of the time interval between the uplink scheduling and the uplink data transmission, wherein one operating band corresponds to one third smallest value; and the determining, by the network node based on the information, a third time interval between uplink scheduling and uplink data transmission comprises:

determining, by the network node, the third time interval based on the third smallest value.

4. The method according to claim 1, wherein the information comprises a correspondence between a bandwidth supported by the terminal device and a first smallest value of the time interval between the downlink scheduling and the downlink data transmission, wherein one bandwidth corresponds to one first smallest value; and the determining, by the network node based on the information, a first time interval between downlink scheduling and downlink data transmission comprises:

determining, by the network node, the first time interval based on the first smallest value;

and/or the information comprises a correspondence between a bandwidth supported by the terminal device and a second smallest value of the time interval between the downlink data transmission and sending the feedback message by the terminal device after receiving the downlink data, wherein one bandwidth corresponds to one second smallest value; and the determining, by the network node based on the information, a second time interval between the downlink data transmission and a feedback message sent by the terminal device after the terminal device receives the downlink data comprises:

determining, by the network node, the second time interval based on the second smallest value; and/or the information comprises a correspondence between a bandwidth supported by the terminal device and a third smallest value of the time interval between the uplink scheduling and the uplink data transmission, wherein one bandwidth corresponds to one third smallest value; and the determining, by the network node based on the information, a third time interval between uplink scheduling and uplink data transmission comprises:

determining, by the network node, the third time interval based on the third smallest value.

5. The method according to claim 1, wherein the information comprises a correspondence between a subcarrier spacing and a bandwidth that are supported by the terminal device and a first smallest value of the time interval between the downlink scheduling and the downlink data transmission, wherein one subcarrier spacing and one bandwidth correspond to one first smallest value; and the determining, by the network node based on the information, a first time interval between downlink scheduling and downlink data transmission comprises:

determining, by the network node, the first time interval based on the first smallest value;

and/or the information comprises a correspondence between a subcarrier spacing and a bandwidth that are supported by the terminal device and a second smallest value of the time interval between the downlink data transmission and sending the feedback message by the terminal device after receiving the downlink data, wherein one subcarrier spacing and one bandwidth correspond to one second smallest value; and the determining, by the network node based on the information, a second time interval between the downlink data transmission and a feedback message sent by the terminal device after the terminal device receives the downlink data comprises:

determining, by the network node, the second time interval based on the second smallest value; and/or the information comprises a correspondence between a subcarrier spacing and a bandwidth that are supported by the terminal device and a third smallest value of the time interval between the uplink scheduling and the uplink data transmission, wherein one subcarrier spacing and one bandwidth correspond to one third smallest value; and the determining, by the network node based on the information, a third time interval between uplink scheduling and uplink data transmission comprises:

determining, by the network node, the third time interval based on the third smallest value.

6. The method according to claim 1, wherein the information comprises a correspondence between a subcarrier spacing supported by the terminal device and a first time set of the time interval between the downlink scheduling and the downlink data transmission, wherein one subcarrier spacing corresponds to one first time set; and the determining, by the network node based on the information, a first time interval between downlink scheduling and downlink data transmission comprises:
determining, by the network node, the first time interval based on the first time set; and/or
the information comprises a correspondence between a subcarrier spacing supported by the terminal device and a second time set of the time interval between the downlink data transmission and sending the feedback message by the terminal device after receiving the downlink data, wherein one subcarrier spacing corresponds to one second time set; and
the determining, by the network node based on the information, a second time interval between the downlink data transmission and a feedback message sent by the terminal device after the terminal device receives the downlink data comprises:
determining, by the network node, the second time interval based on the second time set;
and/or
the information comprises a correspondence between a subcarrier spacing supported by the terminal device and a third time set of the time interval between the uplink scheduling and the uplink data transmission, wherein one subcarrier spacing and one bandwidth correspond to one third smallest value, and one subcarrier spacing corresponds to one third time set; and
the determining, by the network node based on the information, a third time interval between uplink scheduling and uplink data transmission comprises:
determining, by the network node, the third time interval based on the third smallest value.

7. A method for determining time information, comprising:
sending, by a terminal device, information to a network node, wherein
the information is used by the network node to determine at least one of the following: a first time interval between downlink scheduling and downlink data transmission, a second time interval between the downlink data transmission and a feedback message sent by the terminal device after the terminal device receives the downlink data, and a third time interval between uplink scheduling and uplink data transmission, wherein the information comprises information related to an operating band and a bandwidth supported by the terminal device.

8. The method according to claim 7, wherein the information comprises a correspondence between a subcarrier spacing supported by the terminal device and a first smallest value of the time interval between the downlink scheduling and the downlink data transmission, wherein one subcarrier spacing corresponds to one first smallest value; and/or
the information comprises a correspondence between a subcarrier spacing supported by the terminal device and a second smallest value of the time interval between the downlink data transmission and sending the feedback message by the terminal device after receiving the downlink data, wherein one subcarrier spacing corresponds to one second smallest value; and/or
the information comprises a correspondence between a subcarrier spacing supported by the terminal device and a third smallest value of the time interval between the uplink scheduling and the uplink data transmission, wherein one subcarrier spacing corresponds to one third smallest value.

9. The method according to claim 7, wherein the information comprises a correspondence between an operating band supported by the terminal device and a first smallest value of the time interval between the downlink scheduling and the downlink data transmission, wherein one subcarrier spacing corresponds to one first smallest value; and/or
the information comprises a correspondence between an operating band supported by the terminal device and a second smallest value of the time interval between the downlink data transmission and sending the feedback message by the terminal device after receiving the downlink data, wherein one operating band corresponds to one second smallest value; and/or
the information comprises a correspondence between an operating band supported by the terminal device and a third smallest value of the time interval between the uplink scheduling and the uplink data transmission, wherein one operating band corresponds to one third smallest value.

10. The method according to claim 7, wherein the information comprises a correspondence between a bandwidth supported by the terminal device and a first smallest value of the time interval between the downlink scheduling and the downlink data transmission, wherein one bandwidth corresponds to one first smallest value; and/or
the information comprises a correspondence between a bandwidth supported by the terminal device and a second smallest value of the time interval between the downlink data transmission and sending the feedback message by the terminal device after receiving the downlink data, wherein one bandwidth corresponds to one second smallest value; and/or
the information comprises a correspondence between a bandwidth supported by the terminal device and a third smallest value of the time interval between the uplink scheduling and the uplink data transmission, wherein one bandwidth corresponds to one third smallest value.

11. The method according to claim 7, wherein the information comprises a correspondence between a subcarrier spacing and a bandwidth that are supported by the terminal device and a first smallest value of the time interval between the downlink scheduling and the downlink data transmission, wherein one subcarrier spacing and one bandwidth correspond to one first smallest value; and/or
the information comprises a correspondence between a subcarrier spacing and a bandwidth that are supported by the terminal device and a second smallest value of the time interval between the downlink data transmission and sending the feedback message by the terminal device after receiving the downlink data, wherein one subcarrier spacing and one bandwidth correspond to one second smallest value; and/or
the information comprises a correspondence between a subcarrier spacing and a bandwidth that are supported by the terminal device and a third smallest value of the time interval between the uplink scheduling and the uplink data transmission, wherein one subcarrier spacing and one bandwidth correspond to one third smallest value.

12. The method according to claim 7, wherein the information comprises a correspondence between a subcarrier spacing supported by the terminal device and a first time set of the time interval between the downlink scheduling and the downlink data transmission, wherein one subcarrier spacing corresponds to one first time set; and/or
the information comprises a correspondence between a subcarrier spacing supported by the terminal device and a second time set of the time interval between the downlink data transmission and sending the feedback message by the terminal device after receiving the downlink data, wherein one subcarrier spacing corresponds to one second time set; and/or the information comprises a correspondence between a subcarrier spacing supported by the terminal device and a third time set of the time interval between the uplink scheduling and the uplink data transmission, wherein one subcarrier spacing and one bandwidth correspond to one third smallest value, and one subcarrier spacing corresponds to one third time set.

13. A network node, comprising:
an obtaining module, configured to obtain information sent by a terminal device; and
a determining module, configured to determine at least one of the following based on the information: a first time interval between downlink scheduling and downlink data transmission, a second time interval between the downlink data transmission and a feedback message sent by the terminal device after the terminal device receives the downlink data, and a third time interval between uplink scheduling and uplink data transmission, wherein the information comprises information related to an operating band and a bandwidth supported by the terminal device.

14. The network node according to claim 13, wherein the information comprises a correspondence between a subcarrier spacing supported by the terminal device and a first smallest value of the time interval between the downlink scheduling and the downlink data transmission, wherein one subcarrier spacing corresponds to one first smallest value; and
the determining module is specifically configured to:
determine, by the network node, the first time interval based on the first smallest value;
and/or
the information comprises a correspondence between a subcarrier spacing supported by the terminal device and a second smallest value of the time interval between the downlink data transmission and sending the feedback message by the terminal device after receiving the downlink data, wherein one subcarrier spacing corresponds to one second smallest value; and
the determining module is specifically configured to:
determine, by the network node, the second time interval based on the second smallest value;
and/or
the information comprises a correspondence between a subcarrier spacing supported by the terminal device and a third smallest value of the time interval between the uplink scheduling and the uplink data transmission, wherein one subcarrier spacing corresponds to one third smallest value; and
the determining module is specifically configured to:
determine, by the network node, the third time interval based on the third smallest value.

15. The network node according to claim 13, wherein the information comprises a correspondence between an operating band supported by the terminal device and a first smallest value of the time interval between the downlink scheduling and the downlink data transmission, wherein one operating band corresponds to one first smallest value; and
the determining module is specifically configured to:
determine, by the network node, the first time interval based on the first smallest value;
and/or
the information comprises a correspondence between an operating band supported by the terminal device and a second smallest value of the time interval between the downlink data transmission and sending the feedback message by the terminal device after receiving the downlink data, wherein one operating band corresponds to one second smallest value; and
the determining module is specifically configured to:
determine the second time interval based on the second smallest value;
and/or
the information comprises a correspondence between an operating band supported by the terminal device and a third smallest value of the time interval between the uplink scheduling and the uplink data transmission, wherein one operating band corresponds to one third smallest value; and
the determining module is specifically configured to:
determine the third time interval based on the third smallest value.

16. The network node according to claim 13, wherein the information comprises a correspondence between a bandwidth supported by the terminal device and a first smallest value of the time interval between the downlink scheduling and the downlink data transmission, wherein one bandwidth corresponds to one first smallest value; and
the determining module is specifically configured to:
determine the first time interval based on the first smallest value;
and/or
the information comprises a correspondence between a bandwidth supported by the terminal device and a second smallest value of the time interval between the downlink data transmission and sending the feedback message by the terminal device after receiving the downlink data, wherein one bandwidth corresponds to one second smallest value; and
the determining module is specifically configured to:
determine the second time interval based on the second smallest value;
and/or
the information comprises a correspondence between a bandwidth supported by the terminal device and a third smallest value of the time interval between the uplink scheduling and the uplink data transmission, wherein one bandwidth corresponds to one third smallest value; and
the determining module is specifically configured to:
determine the third time interval based on the third smallest value.

17. The network node according to claim 13, wherein the information comprises a correspondence between a subcarrier spacing and a bandwidth that are supported by the terminal device and a first smallest value of the time interval between the downlink scheduling and the downlink data transmission, wherein one subcarrier spacing and one bandwidth correspond to one first smallest value; and
the determining module is specifically configured to:
determine the first time interval based on the first smallest value;
and/or
the information comprises a correspondence between a subcarrier spacing and a bandwidth that are supported by the terminal device and a second smallest value of the time interval between the downlink data transmission and sending the feedback message by the terminal device after receiving the downlink data, wherein one subcarrier spacing and one bandwidth correspond to one second smallest value; and the determining module is specifically configured to:

determine the second time interval based on the second smallest value;

and/or the information comprises a correspondence between a subcarrier spacing and a bandwidth that are supported by the terminal device and a third smallest value of the time interval between the uplink scheduling and the uplink data transmission, wherein one subcarrier spacing and one bandwidth correspond to one third smallest value; and the determining module is specifically configured to:

determine the third time interval based on the third smallest value.

18. The network node according to claim 13, wherein the information comprises a correspondence between a subcarrier spacing supported by the terminal device and a first time set of the time interval between the downlink scheduling and the downlink data transmission, wherein one subcarrier spacing corresponds to one first time set; and the determining module is specifically configured to:

determine the first time interval based on the first time set; and/or the information comprises a correspondence between a subcarrier spacing supported by the terminal device and a second time set of the time interval between the downlink data transmission and sending the feedback message by the terminal device after receiving the downlink data, wherein one subcarrier spacing corresponds to one second time set; and the determining module is specifically configured to:

determine the second time interval based on the second time set;

and/or the information comprises a correspondence between a subcarrier spacing supported by the terminal device and a third time set of the time interval between the uplink scheduling and the uplink data transmission, wherein one subcarrier spacing and one bandwidth correspond to one third smallest value, and one subcarrier spacing corresponds to one third time set; and the determining module is specifically configured to:

determine the third time interval based on the third smallest value.

* * * * *